(12) United States Patent
Sakhnini et al.

(10) Patent No.: US 11,871,376 B2
(45) Date of Patent: Jan. 9, 2024

(54) PAGING OPERATION WITH NARROW BANDWIDTH PART FREQUENCY HOPPING

(71) Applicant: QUALCOMM Incorporated, San Diego, CA (US)

(72) Inventors: Iyab Issam Sakhnini, San Diego, CA (US); Tao Luo, San Diego, CA (US); Wooseok Nam, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 20 days.

(21) Appl. No.: 17/348,379

(22) Filed: Jun. 15, 2021

(65) Prior Publication Data

US 2021/0392614 A1 Dec. 16, 2021

Related U.S. Application Data

(60) Provisional application No. 63/039,403, filed on Jun. 15, 2020.

(51) Int. Cl.
| | |
|---|---|
| *H04W 72/0453* | (2023.01) |
| *H04L 5/00* | (2006.01) |
| *H04W 72/23* | (2023.01) |
| *H04W 68/00* | (2009.01) |
| *H04W 24/08* | (2009.01) |
| *H04W 80/02* | (2009.01) |
| *H04W 76/11* | (2018.01) |

(52) U.S. Cl.
CPC ......... *H04W 68/005* (2013.01); *H04L 5/0012* (2013.01); *H04W 24/08* (2013.01); *H04W 72/0453* (2013.01); *H04W 72/23* (2023.01); *H04W 76/11* (2018.02); *H04W 80/02* (2013.01)

(58) Field of Classification Search
None
See application file for complete search history.

(56) References Cited

U.S. PATENT DOCUMENTS

| | | | |
|---|---|---|---|
| 2019/0052432 A1* | 2/2019 | Islam | H04L 5/0053 |
| 2019/0268965 A1* | 8/2019 | Jang | H04W 76/15 |
| 2019/0356524 A1* | 11/2019 | Yi | H04L 27/26025 |
| 2020/0059345 A1* | 2/2020 | Pelletier | H04L 5/0087 |
| 2020/0067676 A1* | 2/2020 | Yi | H04W 72/0446 |
| 2020/0145169 A1* | 5/2020 | Zhou | H04W 76/27 |
| 2020/0344761 A1* | 10/2020 | Amuru | H04B 7/0452 |
| 2020/0351818 A1* | 11/2020 | Park | H04W 4/90 |
| 2020/0404617 A1* | 12/2020 | Murray | H04W 68/02 |
| 2022/0039061 A1* | 2/2022 | Murray | H04W 68/02 |

* cited by examiner

*Primary Examiner* — Edan Orgad
*Assistant Examiner* — Emmanuel K Maglo
(74) *Attorney, Agent, or Firm* — Shumaker & Sieffert, PA

(57) ABSTRACT

Aspects of the disclosure relate to techniques for paging operations in a wireless communication network that uses frequency hopping between bandwidth parts (BWPs). A paging indicator message, carried in a paging indicator search space of a given BWP, indicates to a mobile device monitoring the paging indicator search space that a paging message may arrive at the device's next paging occasion. A mobile device using frequency hopping may locate, and hop to, an anchor BWP with a paging indicator search space according to a paging indication periodicity. When it receives a paging indicator message, the device may locate, and hop to, a paging BWP and monitor a paging search space for a paging message. Other aspects, embodiments, and features are also claimed and described.

28 Claims, 12 Drawing Sheets

US 11,871,376 B2

PAGING OPERATION WITH NARROW BANDWIDTH PART FREQUENCY HOPPING

PRIORITY CLAIM

The present Application for Patent claims priority to provisional patent application No. 63/039,403, filed Jun. 15, 2020, assigned to the assignee hereof and hereby expressly incorporated by reference herein as if fully set forth below and for all applicable purposes.

TECHNICAL FIELD

The technology discussed below relates generally to wireless communication systems, and more particularly, to techniques for carrying out paging operations while employing frequency hopping. Some aspects may include enabling and providing communication devices configured for bandwidth part (BWP) hopping to carry out paging operations in a power-efficient manner.

INTRODUCTION

A variety of wireless telecommunication standards are available, providing common protocols that enable different wireless devices to communicate on a municipal, national, regional, and even global level. New radio (e.g., 5G NR) is an example of an emerging telecommunication standard. NR is designed to better support mobile broadband Internet access by improving spectral efficiency, lowering costs, improving services, making use of new spectrum, and better integrating with other open standards. A particular area of interest for NR has shown to be supporting reduced-capability devices, which can provide limited wireless communication capabilities on the same NR network while saving power and/or being less costly to produce.

BRIEF SUMMARY OF SOME EXAMPLES

The following presents a simplified summary of one or more aspects of the present disclosure, to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Aspects of the present disclosure relate to techniques by which a network (e.g., base station, core network, and/or radio access network) may direct a mobile device utilizing frequency hopping (e.g., bandwidth part hopping, or BWP hopping) to monitor a BWP that contains a paging search space (sometimes referred to as a "paging BWP") for a paging message. In some examples, the network may direct the mobile device to monitor the paging BWP by transmitting to the device a paging indicator message. In various aspects, this disclosure provides for a BWP hopping mobile device to locate and hop to an anchor BWP (a BWP that contains a paging indicator search space) based on the device's paging indication periodicity. This disclosure further provides aspects wherein, responsive to the paging indicator message, the device locates and hops to a paging BWP to monitor for a paging message.

In some aspects, this disclosure provides a method of wireless communication by a user-equipment (UE). The UE communicates over a carrier comprising a plurality of bandwidth parts (BWPs) utilizing BWP hopping, by switching between BWPs of the plurality of BWPs according to a hopping pattern. At a given time, the UE receives a paging indicator message in a first BWP of the plurality of BWP. Responsive to the paging indicator message, the UE switches from the first BWP to a paging BWP of the plurality of BWPs, the paging BWP configured to carry paging messages. Thus, the UE receives a paging message in the paging BWP.

In further aspects, this disclosure provides an apparatus for wireless communication, including a processor, a memory communicatively coupled to the processor, and a transceiver communicatively coupled to the processor. The processor and the memory are configured for communicating over a carrier comprising a plurality of bandwidth parts (BWPs) utilizing BWP hopping by configuring the transceiver to switch between BWPs of the plurality of BWPs according to a hopping pattern. They are further configured for receiving, via the transceiver, a paging indicator message in a first BWP of the plurality of BWPs. Still further, they are configured for, responsive to the paging indicator message, switching the transceiver from the first BWP to a paging BWP of the plurality of BWPs, the paging BWP configured to carry paging messages. Still further, they are configured for receiving, via the transceiver, a paging message in the paging BWP.

In still further aspects, this disclosure provides a non-transitory computer-readable storage medium storing computer-executable code. The code includes instructions for causing a wireless communication apparatus to communicate over a carrier comprising a plurality of bandwidth parts (BWPs) utilizing BWP hopping by switching between BWPs of the plurality of BWPs according to a hopping pattern. The code further includes instructions for causing the wireless communication device to receive a paging indicator message in a first BWP of the plurality of BWPs. The code further includes instructions for causing the wireless communication device to, responsive to the paging indicator message, switch from the first BWP to a paging BWP of the plurality of BWPs, the paging BWP configured to carry paging messages. Still further, the code includes instructions for causing the wireless communication device to receive a paging message in the paging BWP.

In yet further aspects, this disclosure provides an apparatus for wireless communication. The apparatus includes means for communicating over a carrier comprising a plurality of bandwidth parts (BWPs) utilizing BWP hopping by switching between BWPs of the plurality of BWPs according to a hopping pattern. The apparatus further includes means for receiving a paging indicator message in a first BWP of the plurality of BWPs. The apparatus further includes means for, responsive to the paging indicator message, switching from the first BWP to a paging BWP of the plurality of BWPs, the paging BWP configured to carry paging messages. The apparatus still further includes means for receiving a paging message in the paging BWP.

These and other aspects of the technology discussed herein will become more fully understood upon a review of the detailed description, which follows. Other aspects, features, and embodiments will become apparent to those of ordinary skill in the art upon reviewing the following description of specific, exemplary embodiments in conjunction with the accompanying figures. While the following description may discuss various advantages and features relative to certain embodiments and figures, all embodiments can include one or more of the advantageous features discussed herein. In other words, while this description may discuss one or more embodiments as having certain advantageous features, one or more of such features may also be used in accordance with the various embodiments discussed herein. In similar fashion, while this description may discuss exemplary embodiments as device, system, or method embodiments, it should be understood that such exemplary embodiments could be implemented in various devices, systems, and methods.

DETAILED DESCRIPTION

The detailed description set forth below in connection with the appended drawings provides a description of various examples and configurations. This description does not represent the only configurations for practicing the concepts described herein. The detailed description includes specific details to provide a thorough understanding of various concepts. However, those skilled in the art will readily recognize that they may practice these concepts without these specific details. In some instances, this description provides well-known structures and components in block diagram form in order to avoid obscuring such concepts.

While this description describes aspects and embodiments by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip (IC) embodiments and other non-module-component based devices (e.g., end-user devices, vehicles, communication devices, computing devices, industrial equipment, retail/purchasing devices, medical devices, artificial intelligence (AI)-enabled devices, etc.). While this disclosure may specifically direct some examples to use cases or applications, these are only part of a wide assortment of applicability of the described innovations. Implementations may span over a spectrum from chip-level or modular components to non-modular, non-chip-level implementations and further to aggregate, distributed, or original equipment manufacturer (OEM) devices or systems incorporating one or more aspects of the disclosed technology. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, radio frequency (RF) chains, power amplifiers, modulators, buffer, processor(s), interleaver, adders/summers, etc.). The disclosed technology may be practiced in a wide variety of devices, chip-level components, systems, distributed arrangements, end-user devices, etc. of varying sizes, shapes, and constitution.

Figure 1:
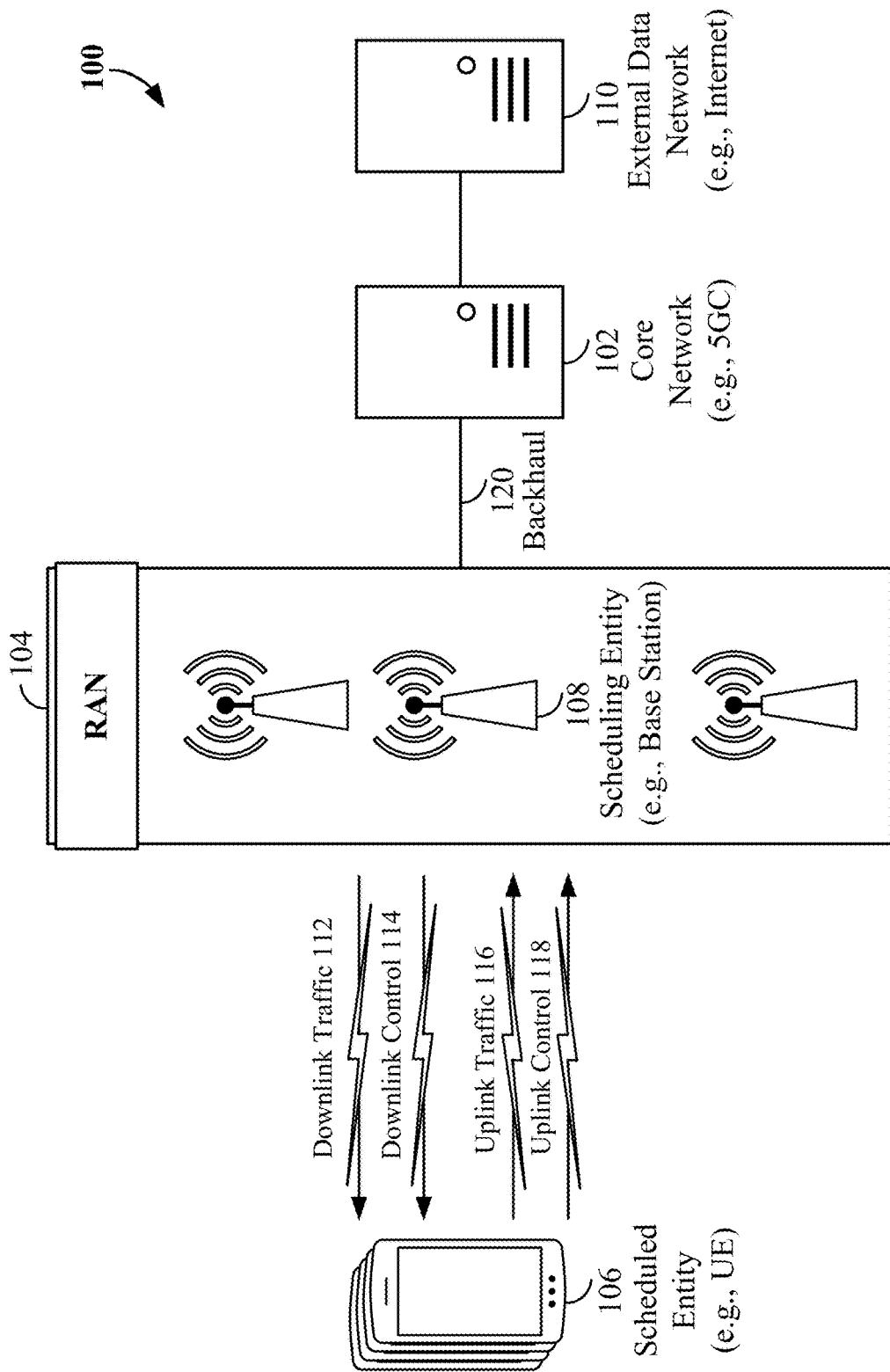
FIG. 1 is a schematic illustration of an example of a wireless communication system.

The disclosure that follows presents various concepts that may be implemented across a broad variety of telecommunication systems, network architectures, and communication standards. Referring now to FIG. 1, as an illustrative example without limitation, this schematic illustration shows various aspects of the present disclosure with reference to a wireless communication system 100. The wireless communication system 100 includes several interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G or 5G NR. In some examples, the RAN 104 may operate under a hybrid of 5G NR and Evolved Universal Terrestrial Radio Access Network (eUTRAN) standards, often referred to as Long-Term Evolution (LTE). 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, those skilled in the art may variously refer to a "base station" as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The RAN 104 supports wireless communication for multiple mobile apparatuses. Those skilled in the art may refer to a mobile apparatus as a UE (as in 3GPP specifications), a mobile station (MS), a subscriber station, a mobile unit, a subscriber unit, a wireless unit, a remote unit, a mobile device, a wireless device, a wireless communication device, a remote device, a mobile subscriber station, an access terminal (AT), a mobile terminal, a wireless terminal, a remote terminal, a handset, a terminal, a user agent, a mobile client, a client, or some other suitable terminology. A mobile apparatus or UE may be an apparatus that provides access to network services. Such a UE may take on many forms and can include a range of devices.

Within the present document, a "mobile" apparatus (aka a UE) need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, e.g., health care at a distance. Telehealth devices may include telehealth-monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
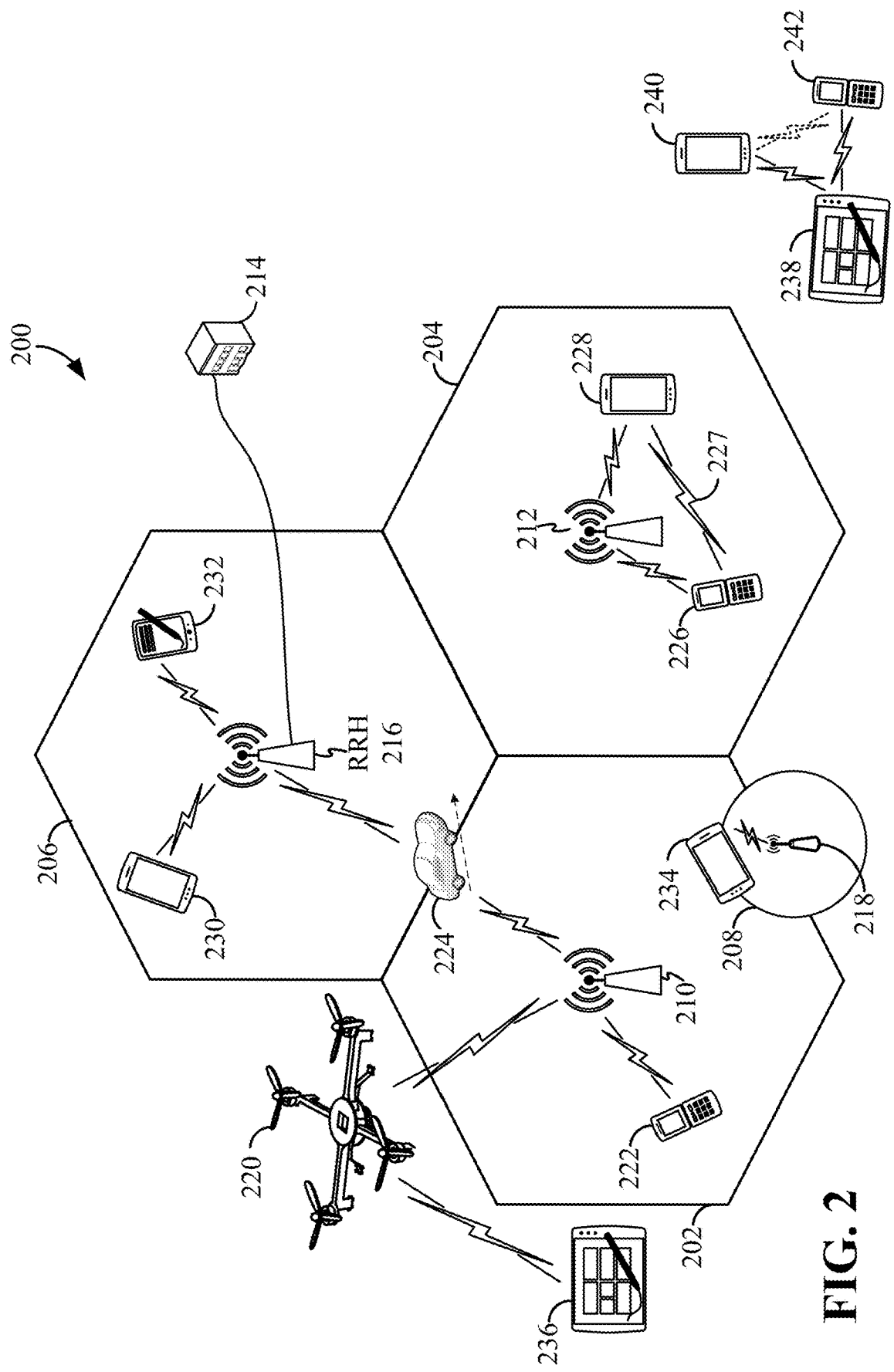
FIG. 2 is a conceptual illustration of an example of a radio access network (RAN).

FIG. 2 provides a schematic illustration of a RAN 200, by way of example and without limitation. In some examples, the RAN 200 may be the same as the RAN 104 described above and illustrated in FIG. 1. The geographic area covered by the RAN 200 may be divided into cellular regions (cells) that a user equipment (UE) can uniquely identify based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, groups of antennas can form the multiple sectors within a cell with each antenna responsible for communication with UEs in a portion of the cell.

FIG. 2 shows two base stations 210 and 212 in cells 202 and 204; and shows a third base station 214 controlling a remote radio head (RRH) 216 in cell 206. That is, a base station can have an integrated antenna or can be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

The RAN 200 may include any number of wireless base stations and cells. Further, a RAN may include a relay node to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes a quadcopter or drone 220, which may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1.

In some examples, a mobile network node (e.g., quadcopter 220) may be configured to function as a UE. For example, the quadcopter 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer-to-peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the scheduling entity 238. Thus, in a wireless communication system with scheduled access to time-frequency resources and having a cellular configuration, a P2P configuration, or a mesh configuration, a scheduling entity and one or more scheduled entities may communicate utilizing the scheduled resources.

The air interface in the radio access network 200 may utilize one or more duplexing algorithms. Duplex refers to a point-to-point communication link where both endpoints can communicate with one another in both directions. Full duplex means both endpoints can simultaneously communicate with one another. Half-duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing That is, at some times the channel is dedicated for transmissions in one direction, while at other times the channel is dedicated for transmissions in the other direction, where the direction may change very rapidly, e.g., several times per slot.

The air interface in the radio access network 200 may also utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes. For example, a UE may provide for UL multiple access utilizing time division multiple access (TDMA), code division multiple access (CDMA), frequency division multiple access (FDMA), sparse code multiple access (SCMA), resource spread multiple access (RSMA), or other suitable multiple access schemes. Further, a base station may multiplex DL transmissions to UEs utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Figure 3:
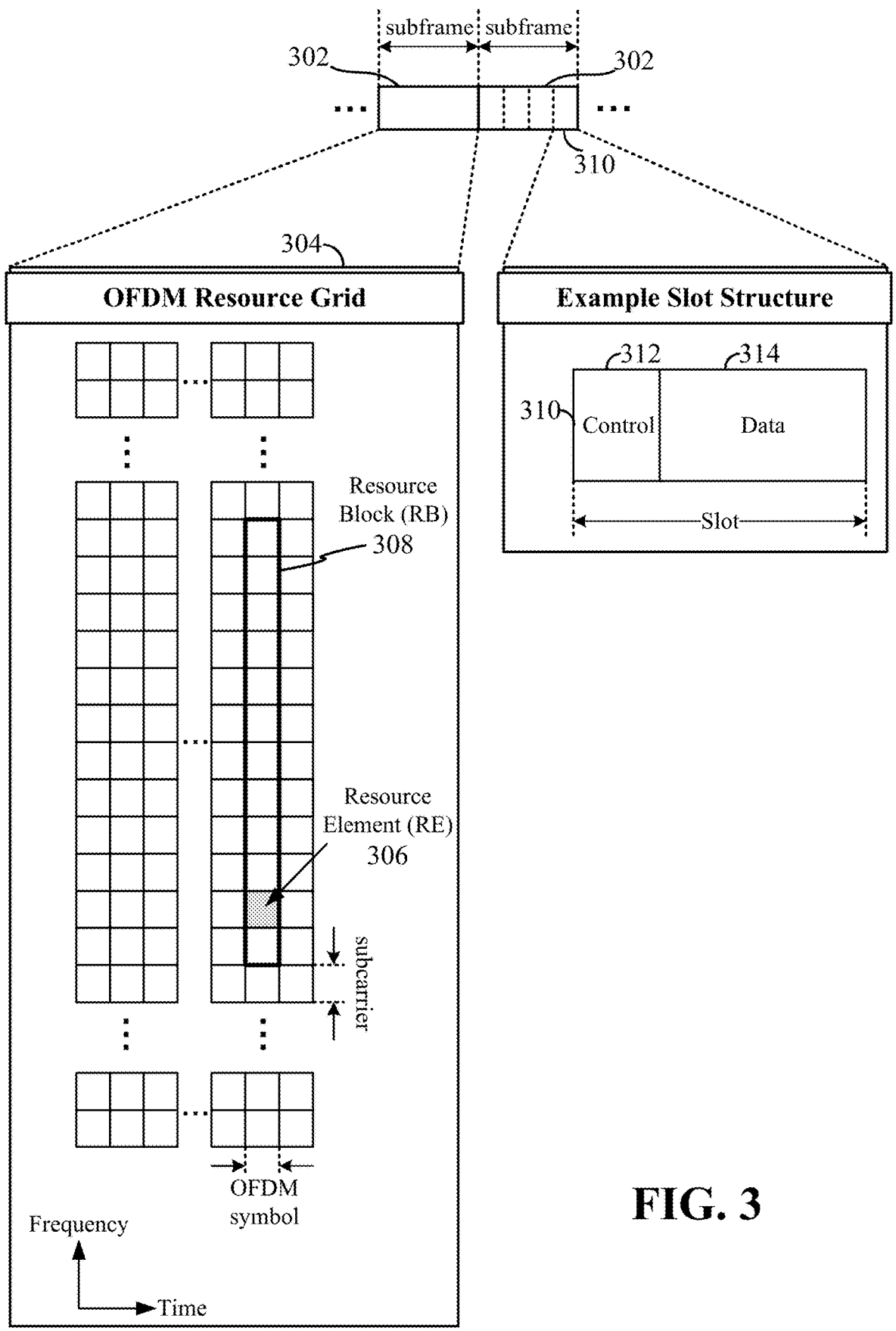
FIG. 3 is a conceptual illustration of an example of wireless resources in a network using orthogonal frequency division multiplexing (OFDM).

FIG. 3 schematically illustrates some aspects of the present disclosure with reference to an OFDM waveform. Those of ordinary skill in the art will understand that the various innovations of the present disclosure may be applied to a DFT-s-OFDMA waveform in substantially the same way as described herein below. That is, while some examples of the present disclosure may focus on an OFDM link for clarity, the same principles may apply as well to DFT-s-OFDMA waveforms.

In 3GPP specifications for 5G NR, a frame may refer to a predetermined duration of time (e.g., 10 ms) for wireless transmissions. Further, each frame may consist of a set of subframes (e.g., 10 subframes of 1 ms each). A given carrier may include one set of frames in the UL, and another set of frames in the DL. FIG. 3 illustrates an expanded view of an exemplary DL subframe 302, showing an OFDM resource grid 304. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers or tones.

The resource grid 304 is divided into multiple resource elements (REs) 306. An RE, which is 1 subcarrier×1 symbol, is the smallest discrete part of the time-frequency grid, and may carry a single complex value representing data from a physical channel or signal. Depending on the modulation used in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In further examples, depending on the numerology, an RB may include any suitable number of consecutive OFDM symbols in the time domain. The present disclosure assumes by way of example that a single RB such as the RB 308 entirely corresponds to a single direction of communication (either transmission or reception for a given device).

A UE generally uses only a subset of the resource grid 304. An RB may be the smallest unit of resources that a scheduler can allocate to a UE. Thus, the more RBs scheduled for a UE and the higher the modulation scheme chosen for the air interface, the higher the data rate for the UE.

In this illustration, the RB 308 occupies less than the entire bandwidth of the subframe 302, with some subcarriers illustrated above and below the RB 308. In a given implementation, the subframe 302 may have a bandwidth corresponding to any number of one or more RBs 308. Further, the RB 308 is shown occupying less than the entire duration of the subframe 302, although this is merely one possible example.

Each 1 ms subframe 302 may consist of one or multiple adjacent slots. In FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., one or two OFDM symbols). In some cases, a base station may transmit mini-slots occupying resources scheduled for ongoing slot transmissions for the same or for different UEs.

An expanded view of one of the slots 310 illustrates the slot 310 including a control region 312 and a data region 314. In general, the control region 312 may carry control channels (e.g., PDCCH), and the data region 314 may carry data channels (e.g., PDSCH or PUSCH). Of course, a slot may contain all DL, all UL, or at least one DL portion and at least one UL portion. The simple structure illustrated in FIG. 3 is merely exemplary in nature, and different slot structures may be utilized, and may include zero or more control region(s) and data region(s).

Although not illustrated in FIG. 3, the various REs 306 within an RB 308 may carry one or more physical channels, including control channels, shared channels, data channels, etc. Other REs 306 within the RB 308 may also carry pilots or reference signals. These pilots or reference signals may provide for a receiving device to perform channel estimation of the corresponding channel, which may enable coherent demodulation/detection of the control and/or data channels within the RB 308.

In a DL transmission, the transmitting device (e.g., the scheduling entity 108) may allocate one or more REs 306 (e.g., within a control region 312) to carry one or more DL control channels. These DL control channels include DL control information 114 (DCI) that generally carries information originating from higher layers, such as a physical broadcast channel (PBCH), a physical downlink control channel (PDCCH), etc., to one or more scheduled entities 106. In addition, the transmitting device may allocate one or more DL REs to carry DL physical signals that generally do not carry information originating from higher layers. These DL physical signals may include a primary synchronization signal (PSS); a secondary synchronization signal (SSS); demodulation reference signals (DM-RS); phase-tracking reference signals (PT-RS); channel-state information reference signals (CSI-RS), etc. A base station may transmit the synchronization signals PSS and SSS (collectively referred to as SS), and in some examples, the PBCH, in an SS block, to provide for a UE's cell search operations, described below.

The PDCCH may carry downlink control information (DCI) for one or more UEs in a cell. This can include, but is not limited to, power control commands, scheduling information, a grant, and/or an assignment of REs for DL and UL transmissions.

In an UL transmission, a transmitting device (e.g., a UE or scheduled entity 106) may utilize one or more REs 306 to carry one or more UL control channels, such as a physical uplink control channel (PUCCH), a physical random access channel (PRACH), etc. These UL control channels include UL control information 118 (UCI) that generally carries information originating from higher layers. Further, UL REs may carry UL physical signals that generally do not carry information originating from higher layers, such as demodulation reference signals (DM-RS), phase-tracking reference signals (PT-RS), sounding reference signals (SRS), etc. In some examples, the control information 118 may include a scheduling request (SR), i.e., a request for the scheduling entity 108 to schedule uplink transmissions. Here, in response to the SR transmitted on the control channel 118, the scheduling entity 108 may transmit downlink control information 114 that may schedule resources for uplink packet transmissions.

UL control information may also include hybrid automatic repeat request (HARQ) feedback such as an acknowledgment (ACK) or negative acknowledgment (NACK), channel state information (CSI), or any other suitable UL control information. HARQ is a technique well known to those of ordinary skill in the art. With HARQ, a receiving device can check the integrity of packet transmissions for accuracy utilizing any suitable integrity checking mechanism, such as a checksum or a cyclic redundancy check (CRC). If the receiving device confirms the integrity of the transmission, it may transmit an ACK, whereas if not confirmed, it may transmit a NACK. In response to a NACK, the transmitting device may send a HARQ retransmission.

In addition to control information, one or more REs 306 (e.g., within the data region 314) may be allocated for user data or traffic data. Such traffic may be carried on one or more traffic channels, such as, for a DL transmission, a physical downlink shared channel (PDSCH); or for an UL transmission, a physical uplink shared channel (PUSCH).

Initial Access Procedure

A UE may perform a given initial access procedure to gain access to a cell and establish a radio resource control (RRC) connection with a RAN. This initial access procedure may include a cell search procedure, a random access procedure, and an RRC connection establishment procedure.

To perform a cell search, a UE monitors certain established resources known to carry synchronization signal/PBCH blocks (SS blocks). Once obtained, a UE can use the synchronization signals to synchronize with a cell and find its Cell ID, and use information in the PBCH to locate and acquire system information (SI) characterizing the cell. The RAN may provide this system information by periodically broadcasting the SS block and system information blocks (SIBs). That is, the UE may obtain a master information block (MIB) from the PBCH carried on the SS block, and a system information block type 1 (SIB1) from an identified data channel Together, the MIB and SIB1 provide a UE with minimum system information (MSI) for cell access. The UE can acquire certain other system information (OSI) from further SIBs that the RAN may broadcast periodically or send on-demand. OSI may include any SI that is not broadcast in the MSI. In some examples, the PDSCH may carry a plurality of SIBs, not limited to SIB1, discussed above. Here, the RAN may provide the OSI in these SIBs, e.g., SIB2 and above.

These operations provide a UE with sufficient RRC information to identify the cell's resources. However, to establish an RRC connection with the cell, a UE may perform a random access procedure. Here, the UE and RAN exchange information with one another and establish an RRC connection. Ongoing connection management, for controlling a UE's connectivity status with the core network, may be handled by way of higher-layer signaling protocols (e.g., RRC).

Reduced-Capability Devices

Some modern wireless networks, such as a 5G NR network, may provide radio resources over a very wide frequency range. However, any given UE accessing a cell may have bandwidth capabilities that do not span this entire range. Accordingly, a RAN may configure a part or a portion of a carrier for that UE, called a bandwidth part (BWP), which has a bandwidth less than or equal to that UE's capabilities. A RAN may configure a UE with several BWPs (in some examples, up to four BWPs); although typically only a single BWP at a time is an active BWP. In this disclosure, a BWP refers to a set of wireless resources (e.g., a contiguous set of PRBs) selected as a subset of the wireless resources on a given carrier. In some examples, a BWP may be selected from among a contiguous set of resource blocks that share a common numerology (e.g., subcarrier spacing) on a given carrier. The RAN generally does not expect a UE to communicate outside an active BWP.

Ongoing discussions for further development of wireless communication systems have frequently raised a desire for network compatibility with various reduced-capability UEs. In some examples, reduced-capability (RedCap) UEs may be devices having lesser or reduced capabilities compared to other UE devices such as smartphones. Some RedCap UEs may be used in applications that only require relatively infrequent data transfers, reduced data throughput requirements, etc. For example, a RedCap UE may have a narrow, limited bandwidth capability, lesser computational complexity, lower power limitations, etc. In this way, RedCap UEs may provide for features such as lower power consumption, less complex design, cheaper manufacturing, etc., conducive to a variety of applications or use cases such as wearable devices, video surveillance applications, industrial sensor applications, etc.

Figure 4:
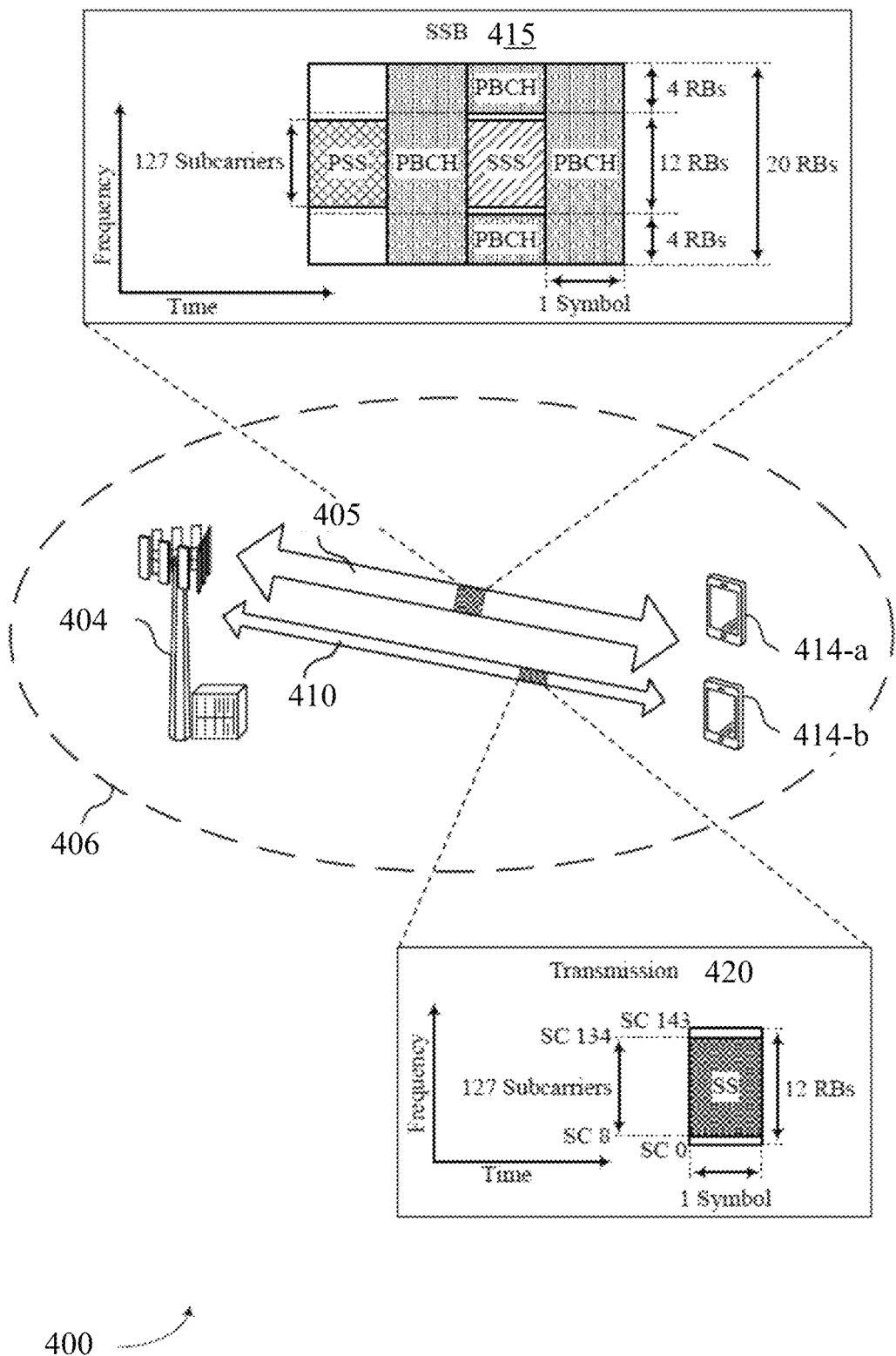
FIG. 4 is a conceptual illustration of an example of a wireless communication system that supports narrow bandwidth part (NBWP) communications for reduced capability devices according to some aspects of this disclosure.

Along the same lines, a RAN may provide for narrow BWPs, or NBWPs. FIG. 4 illustrates an example of a wireless communication system 400 that supports communication via NBWPs in accordance with some aspects of the present disclosure. In some examples, wireless communication system 400 may implement aspects of wireless communication system 100 of FIG. 1 and/or RAN 200 of FIG. 2. Wireless communication system 400 may include a base station 404, a first UE 414-a, and a second UE 414-b, which may be examples of the base stations 108, 210, 212, and/or 216 and the UEs 106, 220, 222, 224, 226, 228, 230, and/or 232, respectively, as described above with reference to FIGS. 1 and 2. For the purpose of illustration, the base station 404 and the second UE 414-b (e.g., a RedCap UE) may be configured to use NBWPs 410 in accordance with the techniques described herein.

In some examples, NBWPs 410 may share similar parameters (e.g., protocol features, numerologies, modulation schemes, etc.) with BWPs 405 to reduce physical layer disruptions within a wireless communication system 400. In other examples, NBWPs 410 may have different parameters than BWPs 405. Generally, the NBWPs 410 may be of smaller (e.g., lesser) bandwidth than BWPs 405 and may include smaller (e.g., lesser) reference signal bandwidth (e.g., or SS block bandwidth). The use of such NBWPs 410 may, in some cases, support narrower beams for enhanced coverage.

In some examples, a base station 404 may be an NR base station (e.g., a gNB) communicating via a link (e.g., such as a BWP 405 and/or an NBWP 410) with the first UE 414-a and the second UE 414-b within a given coverage area 406. For instance, connections may be established using a relatively wide-channel frequency bandwidth. In some cases, one or more portions of the channel frequency bandwidth, such as the BWP(s) 405 and/or the NBWP(s) 410, may be used for communication with the UEs 414. In the example of FIG. 4, a channel frequency bandwidth or a carrier bandwidth may include portions (e.g., the BWP(s) 405) used for communication with the first UE 414-a. Further, according to techniques described herein, a channel frequency bandwidth or a carrier bandwidth may include narrow portions (e.g., the NBWPs 410) used for communication with the second UE 414-b (e.g., which may be an example of a RedCap UE). The BWP(s) 405 and the NBWPs 410 may be associated with the same carrier, or may be associated with different carriers (e.g., in some cases, communication by the first UE 414-a and the second UE 414-b may be associated with the same carrier or with different carriers).

In the example of FIG. 4, a base station 404 may transmit an SS block 415 to a first UE 414-a and/or a second UE 414-b via a BWP 405. The SS block 415 (e.g., and the BWP 405) may include or span 20 RBs in the frequency domain. Further, in other scenarios, a base station 404 may transmit a transmission 420 (e.g., a reduced-bandwidth SS block, a reduced-bandwidth PDSCH transmission, etc.) to a UE 414-b via an NBWP 410. The transmission 420 (e.g., and the NBWP 410) may include or span, for example, 12 RBs in the frequency domain. In some systems, a carrier may be limited to a maximum number of BWP(s) 405 (e.g., up to four BWPs 405 per carrier). However, in some systems, a carrier may include a greater number of NBWPs 410 per carrier than BWPs, to accommodate RedCap UEs.

The example configurations (e.g., frequency domain aspects, time domain aspects, etc.) of BWP 405 and NBWP 410 provided herein are only for descriptive purposes, not to limit the scope of this disclosure. BWPs 405 and NBWPs 410 may be configured with varying bandwidths, may include various other signals or transmissions, may be configured for more or fewer UEs 414, may be configured in greater numbers, etc., by analogy, without departing from the scope of this disclosure.

BWP Hopping

Figure 5:
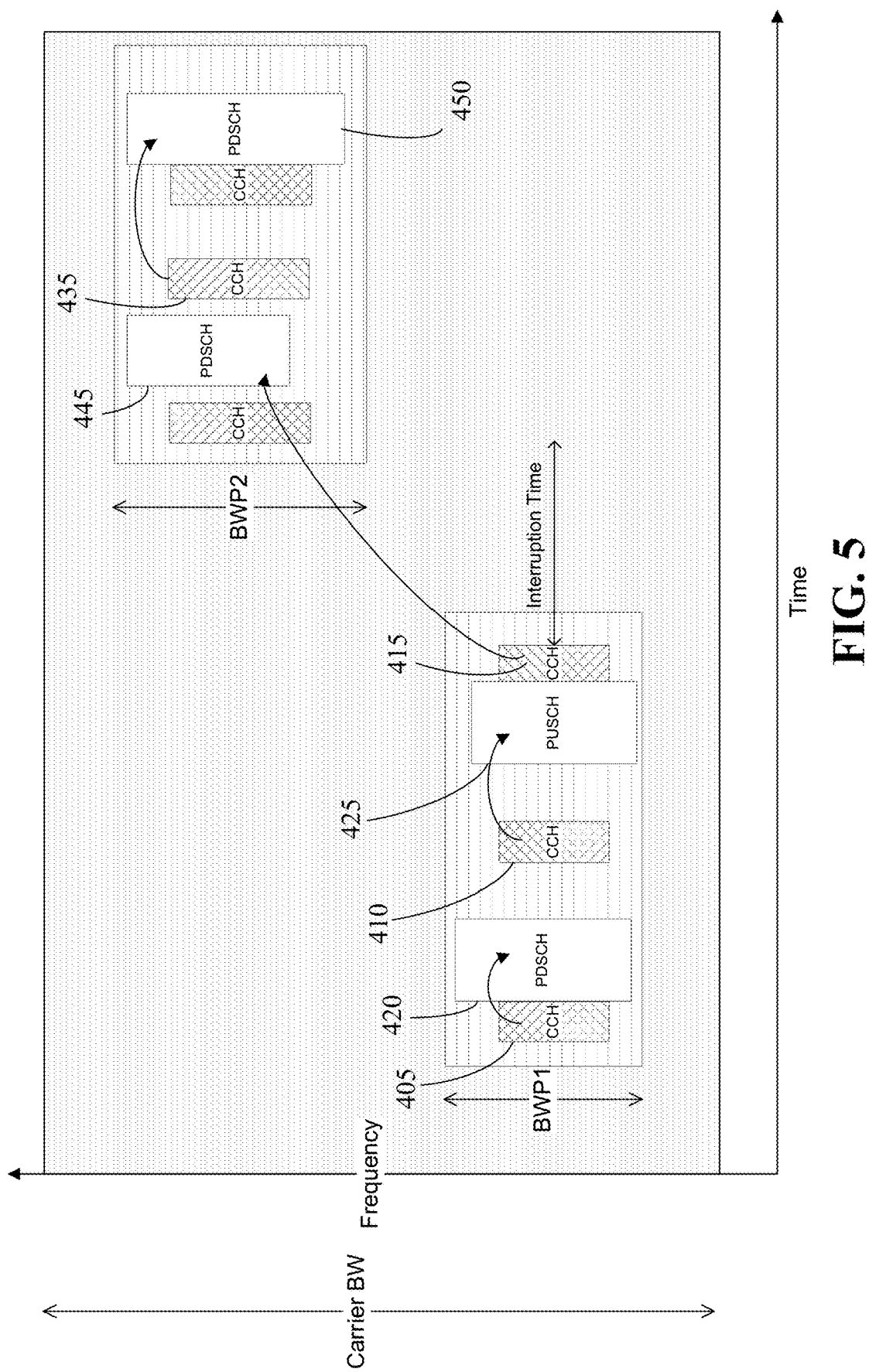
FIG. 5 is an illustration of example operations for frequency hopping between bandwidth parts (BWPs), in accordance with some aspects of this disclosure.

FIG. 5 illustrates example operations for BWP switching or BWP hopping in accordance with aspects of the present disclosure. The illustrated example shows a given carrier configured with two BWPs (e.g., BWP1 and BWP2). Each of BWP1 and BWP2 may have its own associated configurations, such as PDCCH, PDSCH, PUCCH, PUSCH, and RS configurations. For instance, BWP1 may have a first control channel (CCH) 505 that allocates resources for a first PDSCH 520, and a second CCH 510 that allocates resources for a second PUSCH 525. In some examples, downlink control information (DCI) carried on a CCH may instruct a UE to dynamically switch between BWPs. In further examples, a DCI may provide frequency-hopping instructions that define a sequence of BWPs. Here, a UE may switch between the BWPs according to the defined sequence over a given time period. As used herein, the term "frequency hopping" generally refers to switching in frequency between different active portions of one or more carriers. In some examples, frequency hopping may include BWP hopping or narrow BWP (NBWP, described below) hopping, where the active portions correspond to BWPs or NBWPs of one or more carriers.

As illustrated, a third CCH 515 in BWP1 may allocate resources for a third PDSCH 545 in BWP2. BWP2 may also have its own associated configurations. For example, a fourth CCH 535 may allocate resources for a fourth PDSCH 550.

As illustrated, a gap may exist between BWP1 and BWP2, resulting in an interruption time equal to or greater than the BWP switch delay. The gap allows time for the UE to reconfigure its RF front-end circuitry for a BWP hop to its new BWP.

Paging Cycles

To reduce power consumption, a UE's connectivity may change between certain states or modes depending on its current activity. For example, an idle UE may enter a suitable sleep mode, inactive state, or idle state (e.g., RRC_IDLE) where the RAN has no UE context and the UE may not be registered to any specific cell. UEs in an idle state may periodically wake up to monitor for paging messages, as discussed further below.

For a UE in an idle state to transition to a connected state or mode (e.g., RRC_CONNECTED), in some examples, the UE may perform a random access procedure, as described above. This procedure establishes a UE context in the RAN and in the UE and generally prepares the UE for data transfer with the RAN. While in a connected state, relatively inactive times may appear from time to time. In these cases, a UE may employ a discontinuous reception (DRX) cycle to reduce power consumption. Here, although the UE may be in a connected mode, it may power down some of its more energy-intensive circuitry and periodically power it on to monitor for paging messages. Of course, those of ordinary skill in the art will know that in some networks, a UE may employ additional or alternative modes or states for power management.

Supporting these power saving measures at a UE, a RAN 200 and/or a corresponding core network (e.g., core network 102 of FIG. 1) may periodically transmit paging messages. Paging allows the RAN 200 and/or the CN to reach one or more UEs 222 and 224 while they are in an idle or inactive state through paging messages. Paging further allows the RAN 200 and/or the CN to notify UEs in idle, inactive, or connected states of system information changes and Earthquake and Tsunami Warning System/Commercial Mobile Alert System (ETWS/CMAS) indications through Short Messages. Both paging messages and Short Messages are addressed with a Paging Radio Network Temporary Identifier (P-RNTI) on PDCCH, but while the former is sent on a paging channel (PCCH), the latter is sent over Physical Downlink Control Channel (PDCCH) directly.

The RAN may periodically transmit these paging messages according to a defined DRX cycle (e.g., which may be defined in control signaling that the RAN transmits to the UE). In some examples, the UE is only required to monitor paging channels during one Paging Occasion (PO) per DRX cycle. However, the POs of a UE for different types of paging may be based on the same UE ID, resulting in overlapping POs for both. Thus, in some examples, a network may configure the number of different POs in a DRX cycle via system information, and may distribute UEs among those POs based on their UE IDs. The DRX cycles may be configured by the network, for example, according to one or more of the following:

1) For CN-initiated paging, the RAN broadcasts SIBs including a default DRX cycle;
2) For CN-initiated paging, the network can configure a UE-specific DRX cycle via Non-Access-Stratum (NAS) signaling;
3) For RAN-initiated paging, a RAN can provide a UE-specific DRX cycle via Radio Resource Control (RRC) signaling.

Thus, a UE may monitor a designated set of resources (e.g., a paging search space) for any paging messages at designated POs, according to a predetermined schedule. Herein, a paging search space refers to a set of resources on a carrier (which may correspond to a particular BWP, or a "paging BWP") designated for use in transmitting and receiving paging messages. For example, a paging BWP may include a paging search space for carrying paging messages. That is, at least a portion of resources of a paging BWP may be reserved for carrying information other than paging messages.

In some examples, a network may provide to the UE more than one DRX cycle definition via two or all three of the above approaches. In these cases, the UE may select from among these definitions utilizing any suitable selection technique, e.g., by using the shortest one of the provided DRX cycles. For example, a network may transmit a SIB that includes a default DRX cycle for a UE in the idle state, and may additionally use non-access stratum (NAS) signaling to provide a UE with a UE-specific DRX cycle. In this case, the UE may use the shorter of these two DRX cycles.

Paging Indicator Messages

In conventional 5G NR, a network expects a UE to monitor a paging search space within its active BWP, if it exists, for paging messages. However, an NR network does not require a UE to monitor for paging messages on a BWP that is not configured with a paging search space. See 3GPP TS 38.213, section 10.1. Thus, an issue may arise if a UE's active BWP does not carry a paging search space at the UE's next paging occasion. Moreover, when a UE is configured to communicate using NBWPs and frequency hopping, some or all of the multiple NBWPs used and/or monitored by the UE might not enclose a single paging search space. In these cases, a UE undergoing NBWP hopping may be unable to receive paging messages.

To address these issues, a network could potentially configure each BWP (or each NBWP) with a respective paging search space to ensure delivery of paging messages for any frequency-hopping pattern. However, this solution would be resource inefficient, taking up resources in every BWP. In another example utilizing BWP hopping, a network could define a frequency-hopping pattern that requires the UE to hop into a BWP that includes a paging search space at each paging occasion. However, this solution could restrict the operational capabilities of the scheduler (i.e., the base station) to only a relatively small set of available hopping patterns. More resource efficient and less restrictive solutions are described herein that generally involve, e.g., establishing a subset of BWPs and/or NBWPs to carry a paging search space (referred to herein as a paging BWP). Accordingly, a base station may transmit short paging indicator messages to a UE via the UE's active BWP. In response to these paging indicator messages, a UE may switch or hop to a paging BWP to monitor its paging search space for paging messages.

Figure 6:
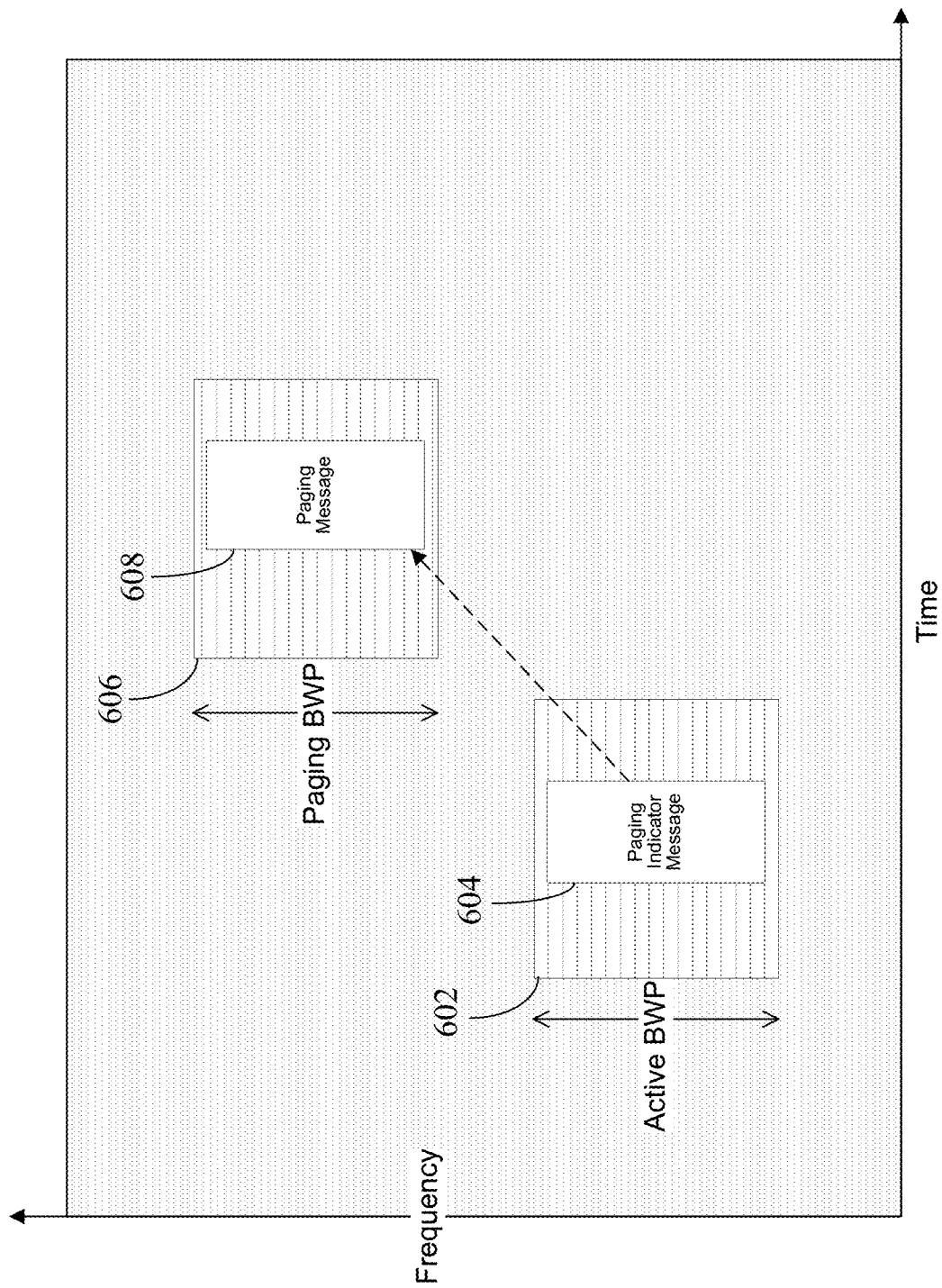
FIG. 6 is an illustration of example operations for switching between an active BWP and a paging BWP according to some aspects of this disclosure.

FIG. 6 illustrates example operations for a UE in communication with a base station, for BWP hopping between an active BWP 602 and a paging BWP 606 responsive to a paging indicator message 604. Here, either or both of the active BWP 602 and/or the paging BWP 606 may be NBWPs. The active BWP 602 may include a paging indicator search space for carrying paging indicator messages. That is, at least a portion of resources of the active BWP 602 may be reserved for carrying messages other than paging indicator messages.

A UE may monitor its active BWP 602. A network (e.g., a base station of the network) may thus notify a UE that a paging message for that UE is scheduled for its next paging occasion by transmitting a paging indicator message 604 to the UE on its active BWP 602. In the illustrated example, the UE's active BWP 602 does not include a paging search space. Thus, when a UE detects a paging indicator message 604, the UE may hop to a paging BWP and monitor its paging search space.

That is, in response to receiving a paging indicator message 604, a UE may switch from monitoring its active BWP 602 to monitoring a paging BWP 606. For example, the UE may reconfigure its RF front-end circuitry (e.g., via antenna tuning, variable impedance matching and/or the like) to monitor the paging BWP 606. The UE may then receive a paging message 608 in the paging BWP 606. In response to the paging message 608, the UE may perform any suitable paging response, including conventional paging responses.

In some examples, a RAN may provide a paging indicator message as a part of a DCI, which is a physical layer control message. In some examples, such a DCI that carries a paging indicator message may be configured as a group-common DCI, or a UE-specific DCI. In addition, in some examples, a network may include a designated (e.g., dedicated) paging indicator field in a DCI.

While FIG. 6 shows a paging indicator message 604 being sent via the 5G NR physical layer, the network may in other examples send a paging indicator message via a transport channel of the 5G NR MAC sublayer. For example, the network could send a paging indicator message to the UE via a MAC control element (MAC-CE).

Locating the Paging BWP

A network may configure any suitable number of BWPs (and/or NBWPs) as paging BWPs, carrying a paging search space. In some examples, a single, individual BWP may be designated as a paging BWP. However, this can potentially result in a bottleneck when the paging BWP's paging search space is limited in size. That is, if many UEs in different active BWPs receive paging indicators and all switch to the paging BWP at the same time, at least some of the UEs may face undesirable delays before the paging BWP is able to provide all the UEs their respective paging messages. Accordingly, other examples may identify a subset of two or more BWPs (and/or NBWPs) as paging BWPs. In this case, however, when a UE receives a paging indicator message 604, the UE may rely on any of several suitable techniques for identifying a location of (e.g., one or more resource blocks associated with) a paging BWP 606 from among a set of candidate BWPs.

A paging indicator message 604 may be a short message and, in some cases, may be as small as a single bit of information. In some examples, however, the network may provide information relating to a selected paging BWP within a paging indicator message 604. For example, a paging indicator message may include an information element that explicitly identifies a paging BWP for the UE to monitor. Such an explicit paging BWP identification message may be located in a designated or dedicated field in a DCI. In other examples, this message may be provided via existing BWP switching mechanisms, e.g., by employing a BWP switching DCI for the herein disclosed purpose. In still other examples, a RAN and UE may be configured to utilize a radio network temporary identifier (RNTI) field carrying information to be interpreted by the UE to identify a paging BWP for the UE to monitor.

In other examples, a UE may determine the location/resources of the paging BWP 606 to monitor based on one or more rules. That is, a RAN may implicitly indicate a location of a paging BWP without necessarily providing explicit signaling of the paging BWP location. In some examples, these rule(s) may be predefined and stored in a memory of the UE. In addition, in some examples, the RAN may provide the rule(s) to the UE via suitable control signaling (e.g., RRC, MAC-CE, SIB, etc.).

For example, a RAN may configure each one of several UEs to have a predefined, designated paging BWP. In this example, the RAN can spread the various UEs in the cell among multiple paging BWPs. Here, the RAN may provide a UE with information indicating its designated paging BWP in any suitable manner, including but not limited to RRC signaling, MAC-CE, etc.

In some aspects, a UE and RAN may employ rules that define a relationship between the location/resources of a UE's active BWP 602 and the location/resources of the identified paging BWP 606. As one example, a paging indicator message carried on a UE's active BWP 602 may imply that a corresponding paging BWP is located at a predetermined, or determinable frequency offset from the active BWP 602. Thus, when a UE receives a paging indicator message, the UE may switch to a paging BWP at a location defined relative to the active BWP (e.g., the BWP that carries the paging indicator message).

In further aspects, a UE may store in its memory the locations/resources where a set or list of paging BWPs is known to be located. For example, the network may provide a set of paging BWPs to the UE utilizing any suitable signaling. In this case, various suitable rules can be used to determine the location of a paging BWP 606 corresponding to a given paging indicator message. For example, a UE that receives a paging indicator message on its active BWP may switch to the closest paging BWP 606 (among the set or list of paging BWPs), e.g., with respect to frequency, to the active BWP 602. In another example, a UE that receives a paging indicator message may employ a pseudorandom selection algorithm to identify a paging BWP among the list or set of paging BWPs. Here, the pseudorandom selection algorithm may correspond to a determinable algorithm known to both the RAN and the UE, such that both nodes select the same paging BWP corresponding to a given paging indicator message. For example, a paging indicator message 604 may include a hashing function input as an information element. The UE may determine the location/resources of the paging BWP 606 by executing a predefined hashing function using the hashing function input from the paging indicator message 604 and, in some examples, at least one other value (e.g., the value of a UE identifier of the UE). In this manner, the UE may pseudo-randomly determine the location/resources of the paging BWP 606. In some aspects, network/base station may execute the same hashing function using the same inputs in order to determine the location/resources of the paging BWP 606 in which to transmit the paging message.

In still further aspects, a carrier, a set of carriers, or a portion of a carrier may be logically divided into multiple regions, called hop regions. Each hop region may include a set of resources, e.g., a contiguous span of resource blocks. For example, each hop region may contain a subset of the carrier's BWPs/NBWPs. Further, each hop region may include at least one paging BWP with a paging search space. In some examples, the hop regions may be non-overlapping with one another. With these hop regions, when a UE receives a paging indicator message in its active BWP 602, the UE may determine in which hop region its active BWP 602 lies. Accordingly, the UE may switch to a paging BWP 606 that is within the same hop region as the active BWP 602. In such examples, a RAN may signal information to a UE defining the hop regions, such that the hop region corresponding to a given BWP can be readily identified. Further, the RAN may signal information to indicate one or more paging BWP locations or identities within each hop region, such that a paging BWP within the current hop region can be readily identified.

Anchor BWPs

In the above discussion, for ease of description it has been assumed that a given UE's active BWP includes a paging indicator search space. However, this need not be the case. That is, only a portion or subset of the BWPs of a given carrier (referred to herein as "anchor BWPs") may include a paging indicator search space. According to an aspect of this disclosure, a UE undertaking BWP hopping or NBWP hopping may hop to one of these anchor BWPs at a suitable time to monitor for a paging indicator message.

Figure 7:
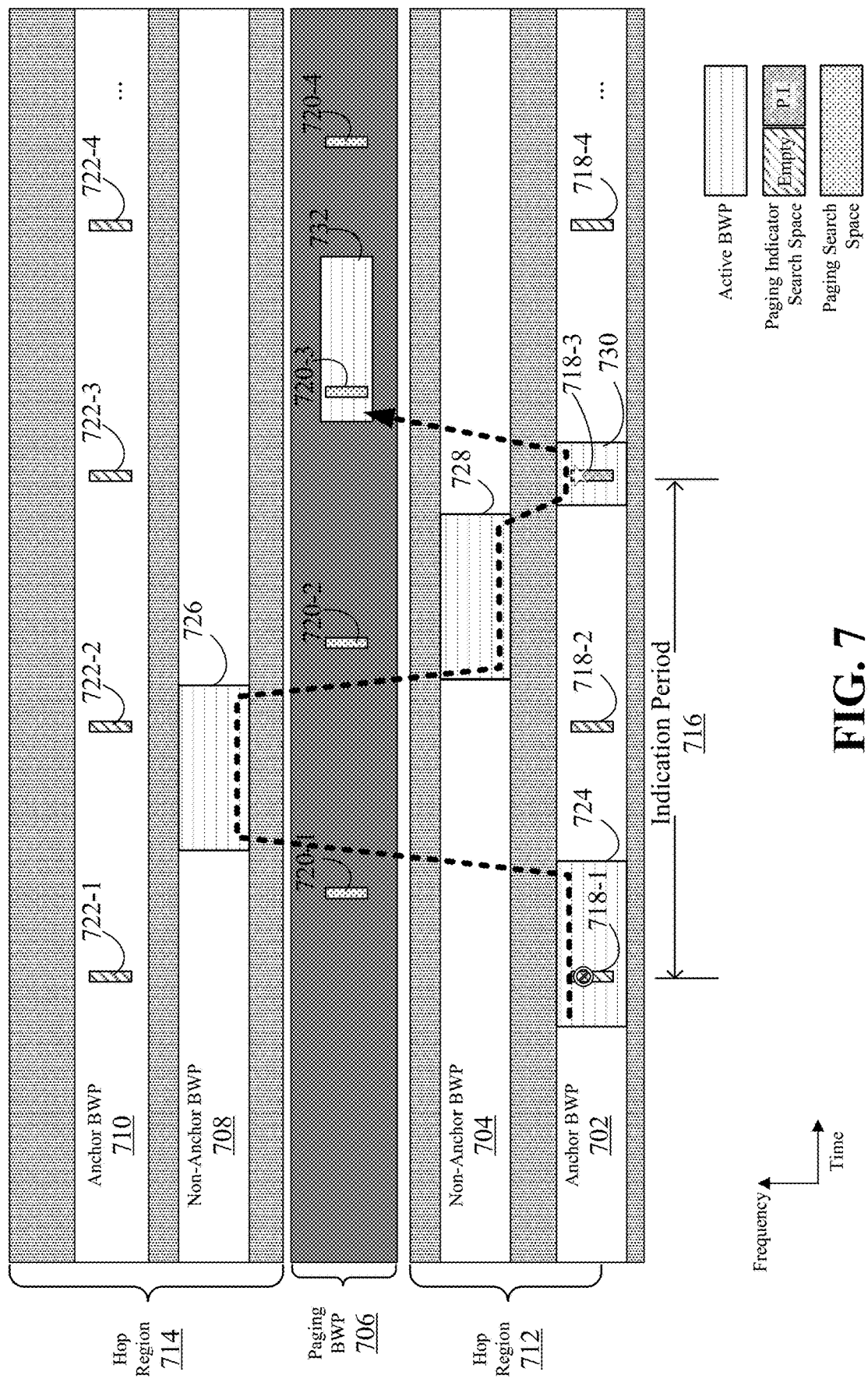
FIG. 7 is an illustration of example operations for frequency hopping and switching between an anchor BWP and a paging BWP according to some aspects of this disclosure.

FIG. 7 shows an illustrative example of operations for a wireless communication system using frequency hopping between BWPs. In the illustration, a RAN may perform paging operations using periodic paging indicator messages carried on a subset of BWPs on the carrier, or anchor BWPs. In the present example, the carrier may include a first hop region 712 and a second hop region 714 (described further below), each including a set of one or more BWPs and/or NBWPs. The carrier further may further include a paging BWP 706, which outside both the first and second hop regions 712, 714. The first hop region 712 may include an anchor BWP 702 having periodic paging indicator search spaces 718, and one or more non-anchor BWPs 704. The second hop region 714 may similarly include an anchor BWP 710 having periodic paging indicator search spaces 722, and one or more non-anchor BWPs 708. The paging BWP 706 may include periodic paging search spaces 720.

In some aspects, this UE may be configured with a paging indication period 716. That is, this UE may monitor a paging indicator search space 718 with a timing or periodicity set according to its paging indication period 716. As illustrated, in some examples, an anchor BWP may include paging indicator search spaces at a different periodicity than that of this UE's paging indication period; however, the RAN may configure the UE not to monitor all the paging indicator search spaces 718, but only to monitor those corresponding to its configured paging indication period 716.

In the illustrated example, a bold, dashed line illustrates an example of a hopping pattern performed by a given UE configured with the illustrated paging indication period 716. That is, for the described example, a given UE undertakes BWP hopping across multiple BWPs, with the BWP that is the UE's active BWP at any given time being illustrated with gray, horizontal lines. Thus, the subject UE has a hopping pattern shown to begin with its active BWP 724 at the anchor BWP 702 carried in the first hop region 712; then to a second active BWP 726 at the non-anchor BWP 708 carried in the second hop region 714; then to an active BWP 728 in the non-anchor BWP 704 in the first hop region 712, etc.

The subject UE may monitor a first paging indicator search space 718-1, since that paging indicator search space 718-1 aligns with this UE's paging indication period 716. In this example, the first paging indicator search space 718-1 does not include a paging indicator message for this UE, so the UE continues its planned hopping pattern and duly switches to the non-anchor BWP 708 in the second hop region 714. As illustrated, the UE uses a hopping pattern that need not use an anchor BWP at times outside of its scheduled paging indication periodicity (e.g., based on the paging indication period 716). Thus, when the UE has its active BWP 726 in a non-anchor BWP, the UE need not monitor for paging indicator messages. (Of course, as described above, nor must the UE monitor for paging messages when its active BWP 726 is not a paging BWP, as shown).

The subject UE is then shown hopping to have its active BWP 728 in a non-anchor BWP(s) 704 in the first hop region 712. The subject UE is next shown hopping to the anchor BWP 702. Here, the UE hops to an anchor BWP 702 at this time based on the time since it last monitored for a paging indicator search space coincides with this UE's paging indication period 716. Thus, when the UE's active BWP 730 is in the anchor BWP 702, the UE once again monitors a paging indicator search space 718-3 of the anchor BWP 702.

In the illustrated example, the RAN transmits a paging indicator message to the subject UE in the paging indicator search space 718-3. The UE accordingly receives the paging indicator message and, in response, hops to a paging BWP 706, and the UE's active BWP 732 moves to the paging BWP 706. For example, the UE may determine the location/resources of the paging BWP 706 to monitor based on the paging indicator message using any applicable technique of those described above in connection with FIG. 6. Once the paging BWP 706 carries the UE's active BWP 732, the UE may monitor a paging search space (e.g., paging search space 720-3) for a paging message.

The RAN may then send a paging message to the subject UE in the paging search space 720-3. The UE may thus receive the paging message, and in response, may then perform any suitable paging response including conventional paging responses.

Locating an Anchor BWP

In some examples, a UE may undertake frequency hopping as described herein on a carrier with multiple anchor BWPs. Accordingly, a UE may determine which anchor BWP to hop to according to its paging indicator period or its scheduled time to monitor for paging indicator messages. Below are several techniques a UE utilizing frequency hopping may employ to ensure that its active BWP is an anchor BWP at suitable times for monitoring a paging indicator search space (e.g., according to the UE's paging indication period).

For example, a RAN may assign each UE in its cell a suitable hopping pattern such that the UE will hop into an anchor BWP at each time the UE is scheduled to monitor for the paging indicator message. However, similar to the discussion above with respect to paging messages, this technique can restrict the freedom of the scheduler in scheduling large numbers of UEs in a cell.

In another example, a RAN may assign a particular anchor BWP to a given UE, for that UE to use for monitoring for a paging indicator message. In this example, a UE may employ any suitable hopping pattern, but according to the UE's paging indication period, the UE hops to its assigned anchor BWP at the appropriate times to monitor for a paging indicator message. By employing this technique, a RAN can distribute UEs in its cell among multiple anchor BWPs. In addition, in some examples, any suitable number of UEs may be assigned to the same anchor BWP.

In a further example, a RAN can assign a particular anchor BWP to a given UE based on a suitable hashing function. For example, a RAN and a UE may be configured to apply the same hashing function, using, e.g., the UE's UE ID as an input to the function, to determine an identification of an assigned anchor BWP for that UE. Accordingly, the RAN and UE can determine which anchor BWP is assigned to a given UE without explicit signaling identifying which anchor BWP is assigned.

In still another example, a UE may be configured to hop to the closest anchor BWP (i.e., the anchor BWP that is the closest in frequency to, or that requires the smallest hop from, the UE's currently active BWP) at the time scheduled for the UE to monitor for the paging indicator message. For example, referring again to FIG. 7, a given UE may have a BWP hopping pattern where its active BWP 728 is in a non-anchor BWP 704 a short time before the next paging indication period. In the illustrated example, as the UE's paging indication period approaches, the UE may hop to the first anchor BWP 702 because that anchor BWP 702 is the closest anchor BWP to the UE's active BWP 728. If the RAN intends to send a paging indicator message to the UE, the RAN may make the same determination as the UE, selecting the anchor BWP 702 to send the paging indicator message because it is nearest, with respect to frequency, to the last active BWP for the UE.

In addition, in yet another example, a RAN may divide or partition a carrier, in frequency, into multiple hop regions, where each hop region includes a subset of the carrier's BWPs and/or NBWPs. Further, the RAN may configure each hop region to include at least one anchor BWP. With this configuration, a UE can hop to the anchor BWP located in the same hop region as the UE's currently active BWP at the time (or based on the time) scheduled for the UE to monitor for a paging indicator message.

For example, FIG. 7 illustrates a first hop region 712 and a second hop region 714. As in the above examples, a given UE may use a hopping pattern that results in that UE at some time having a non-anchor BWP 704 as its active BWP 728. At a time scheduled for the UE to monitor for a paging indicator message, the UE may recognize that its current active BWP 728 is not an anchor BWP. Therefore, the UE may determine to switch or hop to a suitable anchor BWP.

In this example, the UE may determine that its active BWP 728 and a first anchor BWP 702 are both in a first hop region 712. For example, a UE may receive and/or store information in memory defining a set of hop regions within a carrier, and defining anchor BWP identities or locations within each hop region. With this stored information, the UE may identify an anchor BWP 702 located in the same hop region 712 as the active BWP 728. Thus, the UE may switch or hop to the anchor BWP 702 at the time (or based on the time) scheduled for the UE to monitor for the paging indicator message. If the network intends to send a paging indicator message to the UE, the network may also select an anchor BWP in which to send the paging indicator message that is in the same hop region as the last active BWP used by the UE.

While the example of FIG. 7 only illustrates the communication of paging messages and paging indicator messages, the network and UE may transmit and/or receive any other applicable messages and/or control signaling in the resources 724, 726, 728, 730, and/or 732. Further, any or all the BWPs described in FIG. 7 may be NBWPs.

Example Structure

Figure 8:
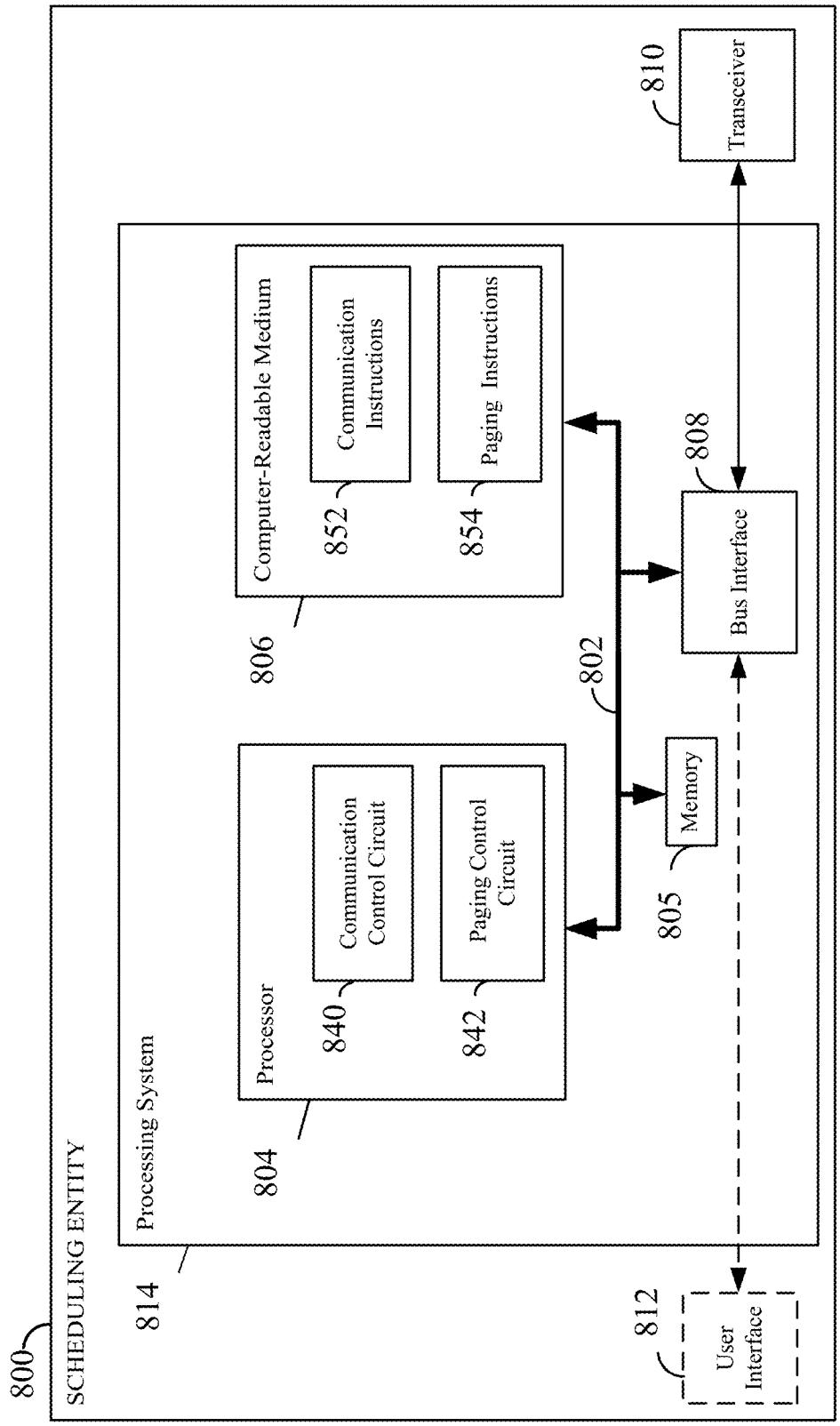
FIG. 8 is a block diagram conceptually illustrating an example of a hardware implementation for a scheduling entity (e.g., a base station) according to some aspects of this disclosure.

FIG. 8 is a block diagram illustrating an example of a hardware implementation for a scheduling entity 800 employing a processing system 814. For example, the scheduling entity 800 may be a user equipment (UE) as illustrated in any one or more of FIGS. 1, 2, and/or 4. In another example, the scheduling entity 800 may be a base station as illustrated in any one or more of FIGS. 1, 2, and/or 4.

The scheduling entity 800 may include a processing system 814 having one or more processors 804. Examples of processors 804 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 800 may be configured to perform any one or more of the functions described herein. That is, the scheduling entity 800 may utilize the processor 804 to implement any one or more of the processes and procedures described below and illustrated in FIG. 12.

The processing system 814 may be implemented with a bus architecture, represented generally by the bus 802. The bus 802 may include any number of interconnecting buses and bridges depending on the specific application of the processing system 814 and the overall design constraints. The bus 802 communicatively couples various circuits including one or more processors (represented generally by the processor 804), a memory 805, and computer-readable media (represented generally by the computer-readable medium 806). The bus 802 may also link various other circuits such as timing sources, peripherals, voltage regulators, and power management circuits, which are well-known in the art, and therefore, will not be described any further. A bus interface 808 provides an interface between the bus 802 and a transceiver 810. The transceiver 810 provides a communication interface or means for communicating with various other apparatus over a transmission medium. Depending upon the nature of the apparatus, a user interface 812 (e.g., keypad, display, speaker, microphone, joystick) may also be provided. Of course, such a user interface 812 is optional, and some examples, such as a base station, may omit it.

In some aspects of the disclosure, the processor 804 may include communication control circuitry 840 configured (e.g., in coordination with the memory 805) for various functions, including, e.g., scheduling one or more scheduled entities for communication on a carrier using a plurality of BWPs, transmitting and receiving control signaling and user data or traffic to/from UEs, coordinating frequency hopping, BWP hopping, NBWP hopping, etc. for UEs, etc. For example, the communication control circuitry 840 may be configured to implement one or more of the functions described below in relation to FIG. 12, including, e.g., block 1202.

In further aspects of the disclosure, the processor 804 may include paging control circuitry 842 configured (e.g., in coordination with the memory 805) for various functions, including, for example, scheduling and transmitting paging indicator messages and paging messages to a UE. For example, the paging circuitry 842 may be configured to implement one or more of the functions described below in relation to FIG. 11, including, e.g., blocks 1204 and 1206.

The processor 804 manages the bus 802 and performs general processing, including executing software stored on the computer-readable medium 806. When the processor 804 executes software, the processing system 814 performs the various functions described in the software for any particular apparatus. The processor 804 may also use the computer-readable medium 806 and the memory 805 for storing data that the processor 804 manipulates when executing software.

Software broadly means instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable storage medium 806. The computer-readable storage medium 806 may be a non-transitory computer-readable storage medium. A non-transitory computer-readable storage medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable storage medium 806 may reside in the processing system 814, external to the processing system 814, or distributed across multiple entities including the processing system 814. The computer-readable storage medium 806 may be embodied in a computer program product. By way of example, a computer program product may include a computer-readable storage medium in packaging materials. Those skilled in the art will recognize how best to implement the described functionality presented throughout this disclosure depending on the particular application and the overall design constraints imposed on the overall system.

In one or more examples, the computer-readable storage medium 806 may store computer-executable code that includes communication control instructions 852 that configure a scheduling entity 800 for various functions, including, e.g., scheduling one or more scheduled entities for communication on a carrier using a plurality of BWPs, transmitting and receiving control signaling and user data or traffic to/from UEs, coordinating frequency hopping, BWP hopping, NBWP hopping, etc. for UEs, etc. For example, the communication control instructions 852 may be configured to cause a scheduling entity 800 to implement one or more of the functions described below in relation to FIG. 12, including, e.g., block 1202.

In further examples, the computer-readable storage medium 806 may store computer-executable code that includes paging instructions 854 that configure a scheduling entity 800 for various functions, including, e.g., scheduling and transmitting paging indicator messages and paging messages to a UE. For example, the communication control instructions 852 may be configured to cause a scheduling entity 800 to implement one or more of the functions described below in relation to FIG. 12, including, e.g., block 1204 and/or 1206.

In one configuration, the apparatus 800 for wireless communication includes means for determining a UE's active BWP, means for transmitting a paging indicator message, and means for transmitting a paging message. In one aspect, the aforementioned means may be the processor 804 shown in FIG. 8 configured to perform the functions recited by the aforementioned means. In another aspect, the aforementioned means may be a circuit or any apparatus configured to perform the functions recited by the aforementioned means.

Of course, in the above examples, the circuitry included in the processor 804 is merely provided as an example. Other means for carrying out the described functions may be included within various aspects of the present disclosure, including but not limited to the instructions stored in the computer-readable storage medium 806, or any other suitable apparatus or means described in any one of the FIGS. 1, 2, and/or 4, and utilizing, for example, the processes and/or algorithms described herein in relation to FIG. 12.

Figure 9:
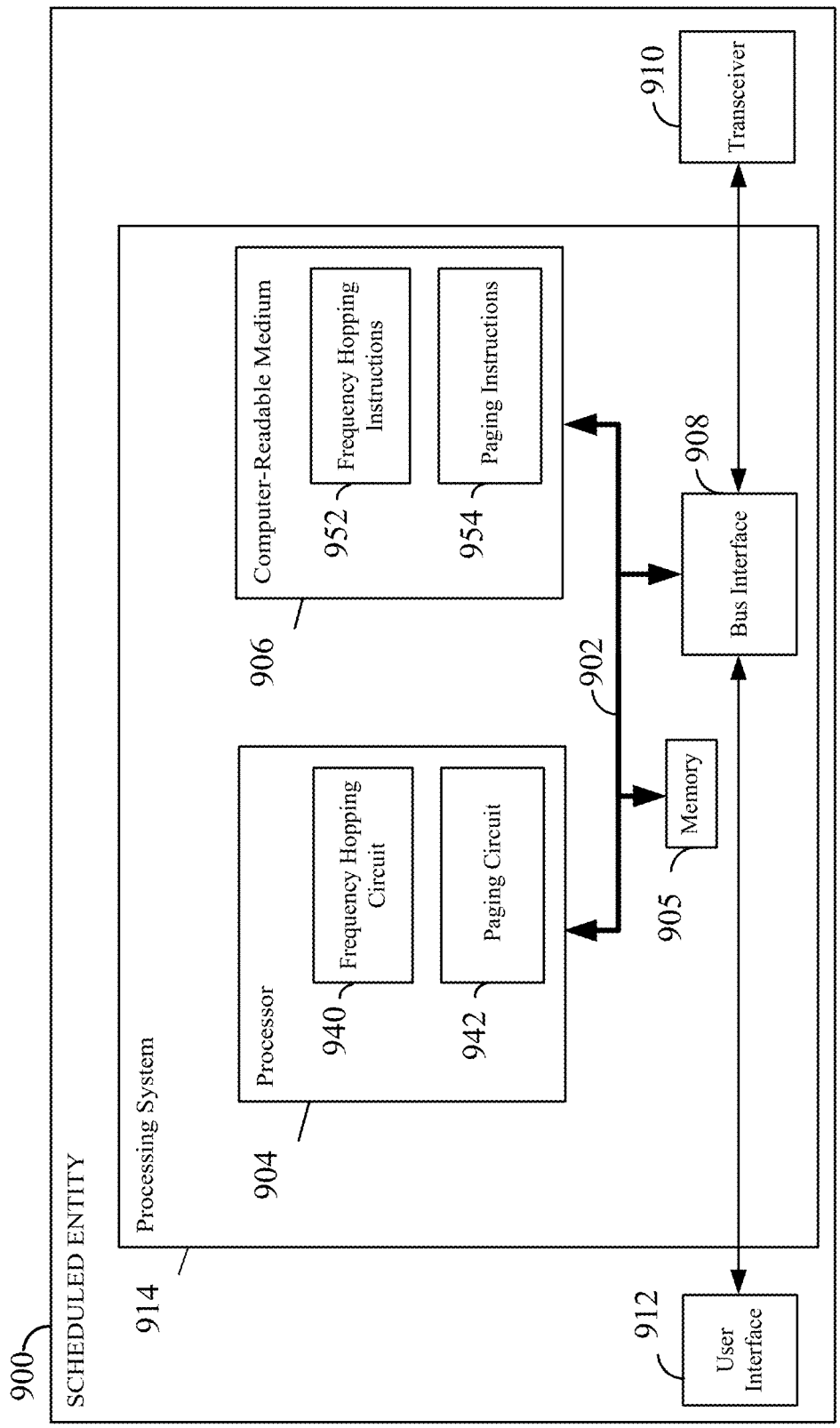
FIG. 9 is a block diagram conceptually illustrating an example of a hardware implementation for a scheduled entity (e.g., a user equipment, UE) according to some aspects of this disclosure.

FIG. 9 is a conceptual diagram illustrating an example of a hardware implementation for an exemplary scheduled entity 900 employing a processing system 914. In accordance with various aspects of the disclosure, a processing system 914 may include an element, or any portion of an element, or any combination of elements having one or more processors 904. For example, the scheduled entity 900 may be a user equipment (UE) as illustrated in any one or more of FIGS. 1, 2, and/or 4.

The processing system 914 may be substantially the same as the processing system 814 illustrated in FIG. 8, including a bus interface 908, a bus 902, memory 905, a processor 904, and a computer-readable medium 906. Furthermore, the scheduled entity 900 may include a user interface 912 and a transceiver 910 substantially similar to those described above in FIG. 8. That is, the processor 904, as utilized in a scheduled entity 900, may be configured (e.g., in coordination with the memory 905) to implement any one or more of the processes described below and illustrated in FIGS. 10 and/or 11.

In some aspects of the disclosure, the processor 904 may include frequency hopping circuitry 940 configured (e.g., in coordination with the memory 905 and/or the transceiver 910) for various functions, including, for example, frequency hopping or BWP hopping according to a hopping pattern, transmitting and receiving control signaling and/or user data or traffic, etc. For example, the frequency hopping circuitry 940 may be configured to implement one or more of the functions described below in relation to FIG. 10, including, e.g., blocks 1002, 1006, and/or 1008. The frequency hopping circuitry 940 may further be configured to implement one or more of the functions described below in relation to FIG. 11, including, e.g., blocks 1102, 1106, 1108, 1114, and/or 1116.

In further aspects of the disclosure, the processor 904 may include paging circuitry 942 configured (e.g., in coordination with the memory 905 and/or the transceiver 910), for various functions, including, for example, monitoring a paging indicator search space and receiving paging indicator messages; monitoring a paging search space and receiving paging messages; indicating paging indication periodicity information for monitoring for a paging indicator message; locating an anchor BWP; locating a paging BWP; etc. For example, the paging circuitry 942 may be configured to implement one or more of the functions described below in relation to FIG. 10 including, e.g., blocks 1002, 1004, 1007, and/or 1010. In a further example, the paging circuitry 942 may be configured to implement one or more of the functions described below in relation to FIG. 11 including, e.g., blocks 1104, 1106, 1110, 1112, 1114, and/or 1118.

And further, the computer-readable storage medium 906 may store computer-executable code that includes frequency hopping instructions 952 that configure a scheduled entity 900 for various functions, including, e.g., frequency hopping or BWP hopping according to a hopping pattern, transmitting and receiving control signaling and/or user data or traffic, etc. For example, the frequency hopping instructions 952 may be configured to cause a scheduled entity 900 to implement one or more of the functions described below in relation to FIG. 10 including, e.g., blocks 1002, 1004, 1007, and/or 1010. The frequency hopping instructions 952 may further be configured to cause a scheduled entity 900 to implement one or more of the functions described below in relation to FIG. 11 including, e.g., blocks 1104, 1106, 1110, 1112, 1114, and/or 1118.

In one configuration, the apparatus 900 for wireless communication includes means for communicating over a wireless carrier, means for receiving a paging indicator message, means for receiving a paging message, means for locating an anchor BWP, means for locating a paging BWP, and means for switching from a first BWP to a second BWP. In one aspect, the aforementioned means may be the processor 904 shown in FIG. 9 configured to perform the functions recited by the aforementioned means. In another aspect, the aforementioned means may be a circuit or any apparatus configured to perform the functions recited by the aforementioned means.

Of course, in the above examples, the circuitry included in the processor 904 is merely provided as an example. Other means for carrying out the described functions may be included within various aspects of the present disclosure, including but not limited to the instructions stored in the computer-readable storage medium 906, or any other suitable apparatus or means described in any one of the FIGS. 1, 2, and/or 4, and utilizing, for example, the processes and/or algorithms described herein in relation to FIGS. 10 and/or 11.

Figure 10:
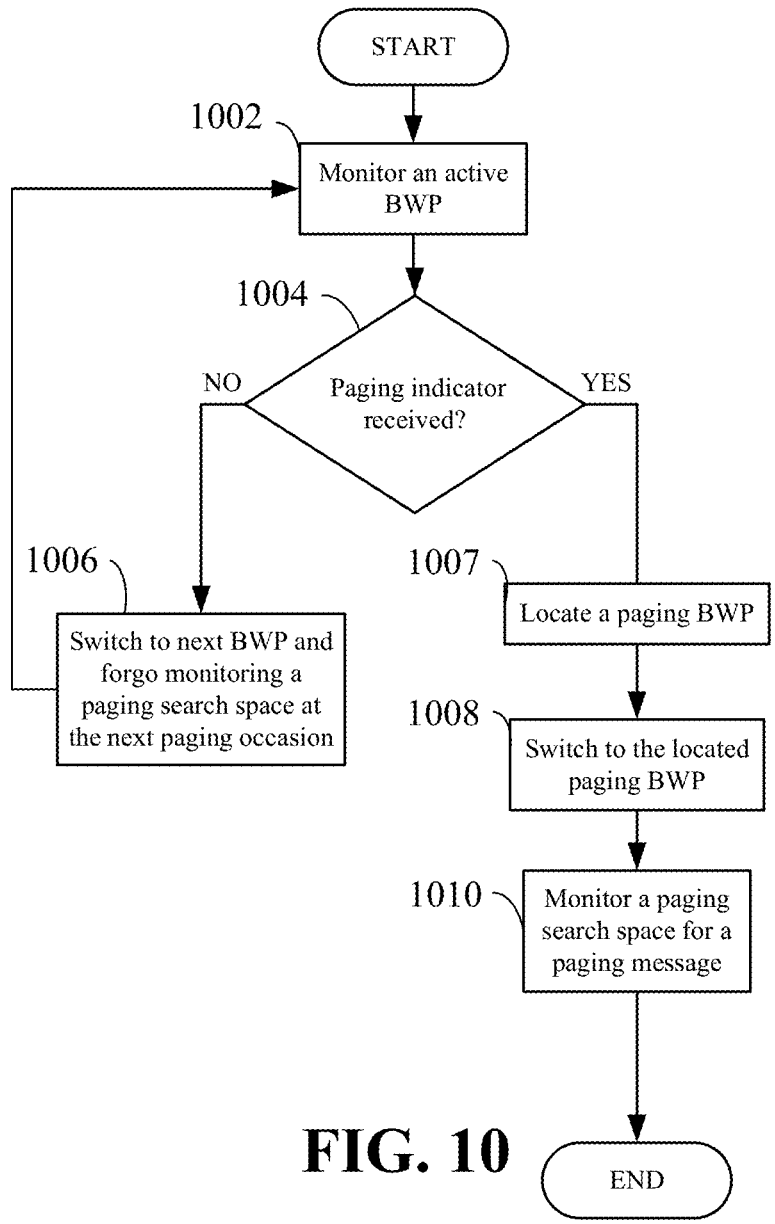
FIG. 10 is a flow chart illustrating an exemplary process for frequency hopping and/or switching from an active BWP to a paging BWP according to some aspects of this disclosure.

FIG. 10 is a flow chart illustrating an exemplary process for paging and paging indicator operations performed by a scheduled entity or UE carrying out frequency hopping (e.g., BWP hopping or NBWP hopping) in accordance with some aspects of the present disclosure. As described below, a particular implementation may omit some or all illustrated features, and may not require some illustrated features to implement all embodiments. In some examples, the scheduled entity 900 illustrated in FIG. 9 may carry out the process of FIG. 10. In some examples, any suitable apparatus or means for carrying out the functions or algorithm described below may carry out the process of FIG. 10.

At block 1002, the UE monitors a BWP (e.g., a first BWP, or an active BWP). For example, a UE's active BWP may include a paging indicator search space for carrying a paging indicator message. Accordingly, a processor 904 in the UE 900 may utilize paging circuitry 942 to control a transceiver 910 to monitor wireless resources in its active BWP designated as a paging indicator search space. As used herein, a BWP may in some examples be an NBWP, as described above. The UE may receive a paging indicator message from the base station in the indicator search space while monitoring the active BWP, or may not receive a paging indicator message in the indicator search space. For example, a RAN may transmit a paging indicator message to a UE utilizing a DCI, a MAC-CE, or any other suitable signaling, as described above.

At block 1004, the UE determines whether its active BWP includes a paging indicator message for the UE. If the UE detects or receives a paging indicator message in the active BWP, the process proceeds to block 1007. If the UE does not detect or receive a paging indicator message in the active BWP, the process proceeds to block 1006.

At block 1006, the UE did not detect or receive a paging indicator, and thus, the UE may forgo monitoring a paging search space during its next paging occasion. Thus, the UE may utilize frequency-hopping circuitry 940 to control a transceiver 910 to switch or hop to any suitable BWP. Here, the UE need not switch or hop to a paging BWP. For example, the UE may continue frequency hopping according to a suitable frequency-hopping scheme. In some examples, the frequency-hopping scheme may be predefined and stored in a memory 905 of a UE 900. In other examples, the RAN may provide the frequency-hopping scheme to the UE via the transmission of control signaling. The frequency-hopping scheme may define a sequence of BWPs for the UE to utilize as its active BWP according to a suitable timing. The UE may then return to block 1002 to monitor its new active BWP. In some aspects, the UE may hop between multiple BWPs at block 1006 in a sequence defined in a frequency hopping scheme before again monitoring a paging indicator search space of an active BWP.

At block 1007, the UE has detected or received a paging indicator that indicates a paging message may be directed to the UE at its next paging occasion. Thus, the UE may determine to switch or hop to a paging BWP to monitor its paging search space for a paging message.

For example, when a UE utilizing frequency hopping as described herein detects or receives a paging indicator message, the UE may identify a location of (e.g., one or more resource blocks associated with) a paging BWP according various techniques, as discussed above. For example, the paging indicator message may include information that the UE uses to identify the location/resources of a paging BWP. This information may be an explicit indication of the location/resources of the paging BWP, or in another example, it may be other suitable information that the UE may utilize determine the location/resources of the paging BWP based on one or more rules. A UE 900 may store information defining these rule(s) in a memory 905, or the RAN may provide information defining these rule(s) to the UE via control signaling (e.g., RRC, MAC-CE, SIB, etc.).

In some examples, a UE may be configured with a designated paging BWP, and may store information about the location/resources of its designated paging BWP in memory 905. In some other examples, a UE may employ a defined relationship between the location/resources of the active BWP and those of the paging BWP (e.g., a defined frequency offset between the active BWP and the paging BWP). In still other examples, a UE may store in memory 905 a set or list of locations/resources designated as paging BWPs, the UE may select a paging BWP from the stored list based on the location/resources of the UE's currently active BWP. For example, the UE may select a paging BWP from the list that is the closest (e.g., with respect to frequency) to the active BWP, the farthest from the active BWP, etc. The UE may additionally or alternatively employ a pseudorandom selection algorithm to identify a paging BWP from the stored list, where the pseudorandom algorithm may take as input parameters the UE's currently active BWP, a UE ID, or other known parameters. In yet further examples, the carrier may be logically divided into multiple hop regions, each including at least one paging BWP. Here, a UE may select a paging BWP from the stored list based on that paging BWP being located within the same hop region as the UE's currently active BWP.

At block 1008, once the UE has located or identified a paging BWP, the UE may switch or hop to the paging BWP. For example, a UE may utilize frequency hopping circuitry 940 to reconfigure RF front-end circuitry of its transceiver 910 (e.g., via antenna tuning, variable impedance matching and/or the like) to monitor the identified paging BWP.

At block 1010, the UE monitors a paging search space of the paging BWP for a paging message. If/when the UE receives a paging message, the UE may perform any suitable paging response, including conventional paging responses.

In different examples, some or all the BWPs monitored by the UE during the process described above in relation to FIG. 10 may be NBWPs.

Figure 11:
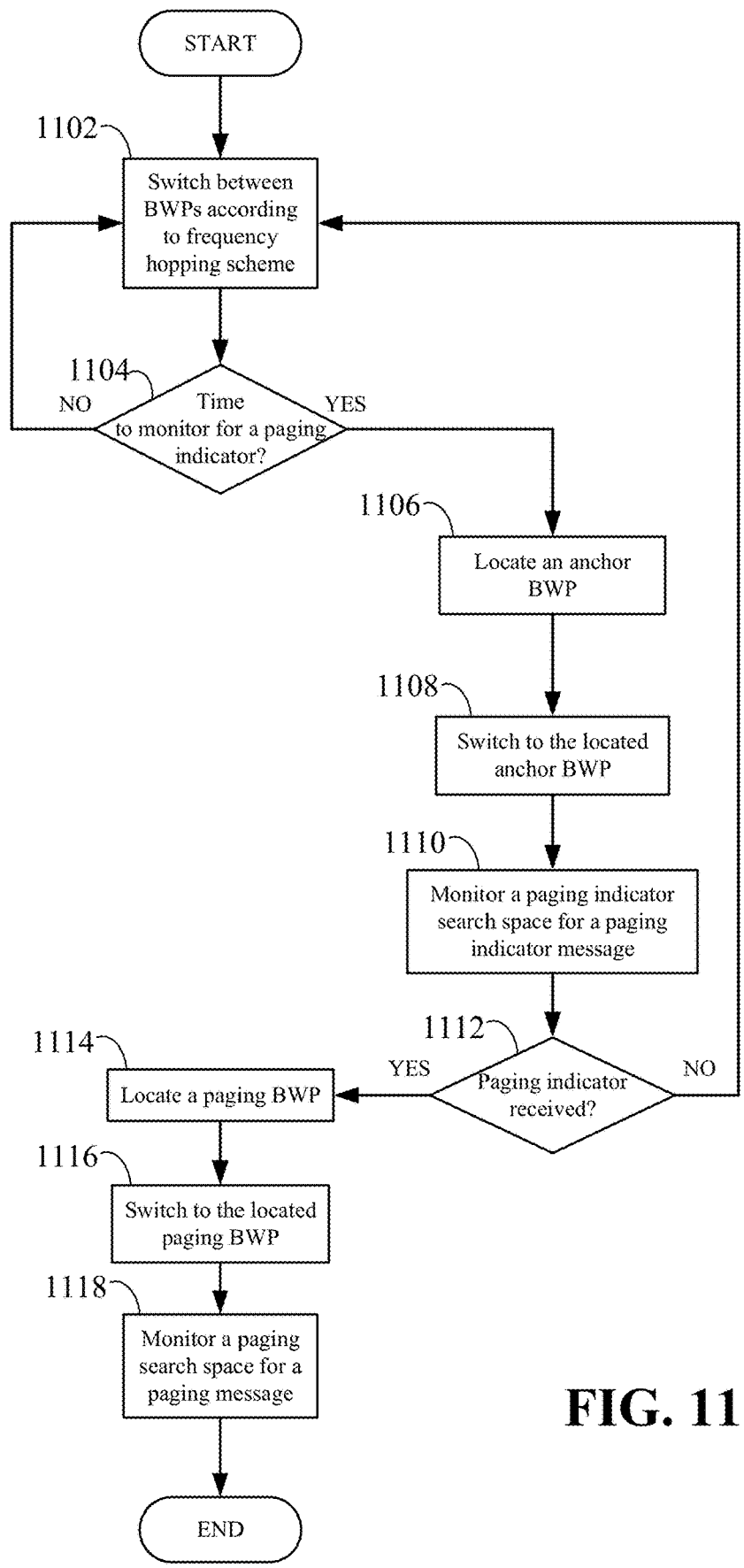
FIG. 11 is a flow chart illustrating an exemplary process for frequency hopping and/or switching from an active BWP to an anchor BWP, and from the anchor BWP to a paging BWP according to some aspects of this disclosure.

FIG. 11 is a flow chart illustrating an exemplary process for paging and paging indicator operations utilizing anchor BWPs performed by a scheduled entity or UE carrying out frequency hopping (e.g., BWP hopping or NBWP hopping) in accordance with some aspects of the present disclosure. As described below, a particular implementation may omit some or all illustrated features, and may not require some illustrated features to implement all embodiments. In some examples, the scheduled entity 900 illustrated in FIG. 9 may carry out the process of FIG. 11. In some examples, any suitable apparatus or means for carrying out the functions or algorithm described below may carry out the process of FIG. 11.

At block 1102, a UE is in communication with a RAN utilizing frequency hopping (e.g., BWP hopping and/or NBWP hopping) as described in various aspects of the present disclosure. It is assumed that the subject UE has access to a timing mechanism (e.g., included in or coupled with a processor 904), such that the UE is capable of determining when it is time to monitor for a paging indicator message. For example, the UE may have a paging indication period or periodicity, such that the UE monitors a paging indicator search space for a paging indicator message according to its paging indication period.

At block 1104, the UE determines whether, according to the timing mechanism described above, it is time for the UE to monitor for a paging indicator message. For example, if a timer included in or coupled with a processor 904 indicates that the UE's paging indication period has passed since its last paging indicator monitoring procedure, then the UE's processor 904 may determine that it is time to monitor for a paging indicator. If the UE determines that it is not time to monitor for a paging indicator, then the process may return to block 1102 and continue frequency-hopping operations until the time to monitor for a paging indicator arrives. If the UE determines that it is time to monitor for a paging indicator then the process may proceed to block 1106.

At block 1106, the UE has determined that it is time to monitor for a paging indicator message. Thus, the UE may determine to switch or hop to an anchor BWP to monitor its paging indicator search space for a paging indicator message. For example, when a UE utilizing frequency hopping as described herein determines that it is time to monitor for a paging indicator message, the UE may identify a location of (e.g., one or more resource blocks associated with) an anchor BWP according various techniques, as discussed above.

For example, a UE may receive an assigned anchor BWP from a RAN, and may thus have information indicating or identifying a location of its assigned anchor BWP in memory. In a further example, rather than storing an explicit indication or location of its assigned anchor BWP, a UE may employ a suitable hashing function (e.g., using the UE's ID as an input to the function) to determine the identity/location of its assigned anchor BWP.

In further examples, a UE may store in memory 905 a list of anchor BWP identifies or locations. The UE may further have the location or resources of its currently active BWP stored in its memory 905, or may employ a suitable technique to determine this information. Here, the UE may identify the closest anchor BWP (i.e., the anchor BWP that is the closest in frequency to, or that requires the smallest hop from, the UE's currently active BWP).

In addition, in still further examples, a UE may store in memory 905 information defining a set of hop regions, and defining anchor BWP identities or locations within each hop region. With this stored information, the UE may identify an anchor BWP located in the same hop region as its currently active BWP.

At block 1108, once the UE has located or identified an anchor BWP, the UE may switch or hop to the located anchor BWP. For example, a UE may utilize frequency hopping circuitry 940 to reconfigure RF front-end circuitry of its transceiver 910 (e.g., via antenna tuning, variable impedance matching and/or the like) to monitor the identified anchor BWP.

At block 1110, the UE monitors a paging indicator search space of the anchor BWP for a paging indicator message. If the UE detects a paging indicator message in the paging indicator search space, the process proceeds to block 1114. If the UE does not receive a paging indicator message in the active BWP, the process returns to block 1102.

At block 1114, the UE has received a paging indicator that indicates a paging message may be directed to the UE at its next paging occasion. Thus, the UE may determine to switch or hop to a paging BWP to monitor its paging search space for a paging message.

For example, when a UE utilizing frequency hopping as described herein detects a paging indicator message, the UE may identify a location of (e.g., one or more resource blocks associated with) a paging BWP according various techniques, as discussed above. For example, the paging indicator message may include information that the UE uses to identify the location/resources of a paging BWP. This information may be an explicit indication of the location/resources of the paging BWP, or in another example, it may be other suitable information that the UE may utilize determine the location/resources of the paging BWP based on one or more rules. A UE 900 may store information defining these rule(s) in a memory 905, or the RAN may provide information defining these rule(s) to the UE via control signaling (e.g., RRC, MAC-CE, SIB, etc.).

In some examples, a UE may be configured with a designated paging BWP, and may store information about the location/resources of its designated paging BWP in memory 905. In some other examples, a UE may employ a defined relationship between the location/resources of the active BWP and those of the paging BWP (e.g., a defined frequency offset between the active BWP and the paging BWP). In still other examples, a UE may store in memory 905 a set or list of locations/resources designated as paging BWPs, the UE may select a paging BWP from the stored list based on the location/resources of the UE's currently active BWP. For example, the UE may select a paging BWP from the list that is the closest (e.g., with respect to frequency) to the active BWP, the farthest from the active BWP, etc. The UE may additionally or alternatively employ a pseudorandom selection algorithm to identify a paging BWP from the stored list, where the pseudorandom algorithm may take as input parameters the UE's currently active BWP, a UE ID, or other known parameters. In yet further examples, the carrier may be logically divided into multiple hop regions, each including at least one paging BWP. Here, a UE may select a paging BWP from the stored list based on that paging BWP being located within the same hop region as the UE's currently active BWP.

At block 1116, once the UE has located or identified a paging BWP, the UE may switch or hop to the paging BWP. For example, a UE may utilize frequency hopping circuitry 940 to reconfigure RF front-end circuitry of its transceiver 910 (e.g., via antenna tuning, variable impedance matching and/or the like) to monitor the identified paging BWP.

At block 1118, the UE monitors a paging search space of the paging BWP for a paging message. If/when the UE receives a paging message, the UE may perform any suitable paging response, including conventional paging responses.

Figure 12:
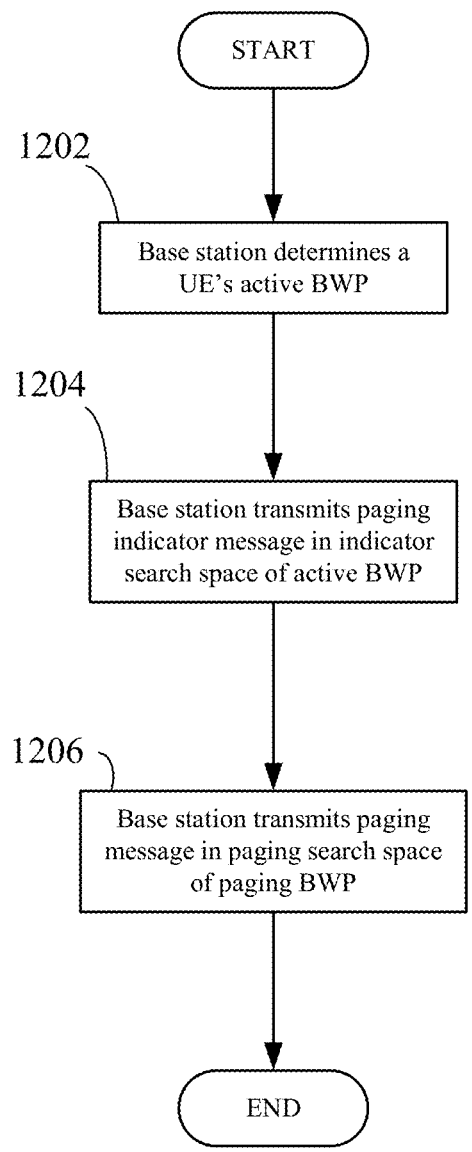
FIG. 12 is a flow chart illustrating an exemplary process for paging indication and paging by a base station or scheduling entity according to some aspects of this disclosure.

FIG. 12 is a flow chart illustrating an exemplary process for paging operations performed by a scheduling entity or base station of a RAN in accordance with some aspects of the present disclosure. As described below, a particular implementation may omit some or all illustrated features, and may not require some illustrated features to implement all embodiments. In some examples, the scheduling entity 800 illustrated in FIG. 8 may carry out the process of FIG. 12. In some examples, any suitable apparatus or means for carrying out the functions or algorithm described below may carry out the process of FIG. 12.

At block 1202, a base station determines an active BWP for a given UE. For example, the base station may include a scheduler (e.g., a communication control circuit 840) that schedules wireless resources for the in a particular BWP, and may further control a frequency hopping scheme for the UE to employ for hopping between BWPs and/or NBWPs, as described above.

At block 1204, the base station transmits a paging indicator message in a paging indicator search space of the UE's active BWP. For example, a paging control circuit 842 may control a transceiver 801 at a scheduling entity 800 to transmit a suitable paging indicator message to the UE. As described above, the paging indicator message may be as simple as a single bit of information indicating that a paging message is to be anticipated, or in other examples, may include information to enable the UE to identify or locate a paging BWP in which the expected paging message will be transmitted.

At block 1206, the base station transmits a paging message for the UE in a paging search space of a paging BWP. Again, in some examples, the base station may indicate the location or identity of the paging BWP to the UE via the paging indicator message. For example, the scheduling entity may include information that explicitly defines the location/resources of the paging BWP in the paging indicator message.

In some other examples, a base station may employ a defined relationship between the location/resources of the UE's active BWP and those of the paging BWP (e.g., a defined frequency offset between the active BWP and the paging BWP). In still other examples, a base station may provide, via any suitable signaling technique, a set or list of locations/resources designated as paging BWPs. Thus, the base station may select a paging BWP from the list based on the location/resources of the UE's currently active BWP. For example, the base station may select a paging BWP from the list that is the closest (e.g., with respect to frequency) to the active BWP, the farthest from the active BWP, etc. The base station may additionally or alternatively employ a pseudorandom selection algorithm to identify a paging BWP from the stored list, where the pseudorandom algorithm may take as input parameters the UE's currently active BWP, a UE ID, or other known parameters. In yet further examples, the carrier may be logically divided into multiple hop regions, each including at least one paging BWP. Here, a base station may select a paging BWP from the list based on that paging BWP being located within the same hop region as the UE's currently active BWP.

This disclosure presents several aspects of a wireless communication network with reference to an exemplary implementation. As those skilled in the art will readily appreciate, various aspects described throughout this disclosure may be extended to other telecommunication systems, network architectures, and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

The present disclosure uses the word "exemplary" to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage, or mode of operation. The present disclosure uses the term "coupled" to refer to a direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The present disclosure uses the terms "circuit" and "circuitry" broadly, to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features, and/or functions illustrated in FIGS. 1-12 may be rearranged and/or combined into a single component, step, feature, or function or embodied in several components, steps, or functions. Additional elements, components, steps, and/or functions may also be added without departing from novel features disclosed herein. The apparatus, devices, and/or components illustrated in FIGS. 1-12 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

Applicant provides this description to enable any person skilled in the art to practice the various aspects described herein. Those skilled in the art will readily recognize various modifications to these aspects, and may apply the generic principles defined herein to other aspects. Applicant does not intend the claims to be limited to the aspects shown herein, but to be accorded the full scope consistent with the language of the claims, wherein reference to an element in the singular is not intended to mean "one and only one" unless specifically so stated, but rather "one or more." Unless specifically stated otherwise, the present disclosure uses the term "some" to refer to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

FURTHER EXAMPLES HAVING A VARIETY OF FEATURES

Some implementation examples are described in the following numbered clauses:

1. A method of wireless communication by a user-equipment (UE), comprising: communicating over a carrier comprising a plurality of bandwidth parts (BWPs) utilizing BWP hopping by switching between BWPs of the plurality of BWPs according to a hopping pattern, receiving a paging indicator message in a first BWP of the plurality of BWPs; responsive to the paging indicator message, switching from the first BWP to a paging BWP of the plurality of BWPs, the paging BWP configured to carry paging messages; and receiving a paging message in the paging BWP.
2. The method of clause 1, further comprising receiving a media access control (MAC) control element (CE) that includes the paging indicator message.
3. The method of clause 1, further comprising receiving a downlink control information (DCI) message that includes the paging indicator message.
4. The method of either of clauses 1 or 3, wherein the DCI is common to a plurality of UEs that includes the UE.
5. The method of any of clauses 1-4, wherein the first BWP is located at first resources, and the paging BWP is located at second resources having a predetermined relationship with the first resources.
6. The method of any of clauses 1-5, wherein the predetermined relationship comprises a predetermined frequency offset between the first resources and the second resources.
7. The method of any of clauses 1-5, wherein the paging BWP is a selected paging BWP from among a plurality of paging BWPs of the plurality of BWPs, and wherein the predetermined relationship comprises the selected paging BWP being a closest paging BWP to the first BWP from among the plurality of paging BWPs.
8. The method of any of clauses 1-7, wherein paging indicator message comprises resource information for identifying a resource location of the paging BWP, the resource information comprising at least one of: an explicit indication of the resource location of the paging BWP, a radio network temporary identifier (RNTI) field comprising information indicating the resource location of the paging BWP, or an input parameter for a hashing function for calculation of the resource location of the paging BWP.
9. The method of any of clauses 1-7, wherein the paging BWP is a selected paging BWP from among a plurality of paging BWPs of the plurality of BWPs, wherein the carrier comprises a plurality of non-overlapping hop regions, each of the hop regions comprising a respective subset of BWPs of the plurality of BWPs, each of the respective subsets of BWPs comprising a respective paging BWP, wherein the first BWP is within a first hop region of the plurality of hop regions, and wherein the selected paging BWP is the respective paging BWP of the first hop region.
10. The method of any of clauses 1-9, wherein the communicating over the carrier comprising the plurality of BWPs utilizing BWP hopping comprises monitoring a paging indicator search space of the first BWP according to a predetermined paging indication periodicity.
11. The method of any of clauses 1-10, further comprising switching from a previous BWP to the first BWP based on the predetermined paging indication periodicity.
12. The method of any of clauses 1-11, further comprising receiving an information element indicating the first BWP as an assigned anchor BWP for the UE.
13. The method of any of clauses 1-11, wherein the first BWP is a selected anchor BWP from among a plurality of anchor BWPs of the plurality of BWPs, and wherein the selected anchor BWP is located at a resource location based on a result of a hashing function using an identifier of the UE as an input parameter.
14. The method of any of clauses 1-11, wherein the first BWP is a selected anchor BWP from among a plurality of anchor BWPs of the plurality of BWPs, and wherein the selected anchor BWP is a closest anchor BWP to the previous BWP from among the plurality of anchor BWPs.
15. The method of any of clauses 1-11, wherein the first BWP is a selected anchor BWP from among a plurality of anchor BWPs of the plurality of BWPs, wherein the carrier comprises a plurality of non-overlapping hop regions, each of the hop regions comprising a respective subset of BWPs of the plurality of BWPs, each of the respective subsets of BWPs comprising a respective anchor BWP, wherein the previous BWP is within a first hop region of the plurality of hop regions, and wherein the selected anchor BWP is the respective anchor BWP of the first hop region.
16. An apparatus for wireless communication, comprising: a processor, a memory communicatively coupled to the processor, and a transceiver communicatively coupled to the processor. The processor and the memory are configured for communicating over a carrier comprising a plurality of bandwidth parts (BWPs) utilizing BWP hopping by configuring the transceiver to switch between BWPs of the plurality of BWPs according to a hopping pattern; for receiving, via the transceiver, a paging indicator message in a first BWP of the plurality of BWPs; and responsive to the paging indicator message, for switching the transceiver from the first BWP to a paging BWP of the plurality of BWPs, the paging BWP configured to carry paging messages; and for receiving, via the transceiver, a paging message in the paging BWP.
17. The apparatus of clause 16, wherein the processor and the memory are further configured for receiving, via the transceiver, a media access control (MAC) control element (CE) that includes the paging indicator message.
18. The apparatus of clause 16, wherein the processor and the memory are further configured for receiving, via the transceiver, a downlink control information (DCI) message that includes the paging indicator message.
19. The apparatus of either of clauses 16 or 18, wherein the DCI is common to a plurality of scheduled entities that includes the apparatus.
20. The apparatus of any of clauses 16-19, wherein the first BWP is located at first resources, and the paging BWP is located at second resources having a predetermined relationship with the first resources.
21. The apparatus of any of clauses 16-20, wherein the predetermined relationship comprises a predetermined frequency offset between the first resources and the second resources.
22. The apparatus of any of clauses 16-20, wherein the paging BWP is a selected paging BWP from among a plurality of paging BWPs of the plurality of BWPs, and wherein the predetermined relationship comprises the selected paging BWP being a closest paging BWP to the first BWP from among the plurality of paging BWPs.
23. The apparatus of any of clauses 16-22, wherein paging indicator message comprises resource information for identifying a resource location of the paging BWP, the resource information comprising at least one of: an explicit indication of the resource location of the paging BWP, a radio network temporary identifier (RNTI) field comprising information indicating the resource location of the paging BWP, or an input parameter for a hashing function for calculation of the resource location of the paging BWP.
24. The apparatus of any of clauses 16-22, wherein the paging BWP is a selected paging BWP from among a plurality of paging BWPs of the plurality of BWPs; wherein the carrier comprises a plurality of non-overlapping hop regions, each of the hop regions comprising a respective subset of BWPs of the plurality of BWPs, each of the respective subsets of BWPs comprising a respective paging BWP; wherein the first BWP is within a first hop region of the plurality of hop regions; and wherein the selected paging BWP is the respective paging BWP of the first hop region.
25. The apparatus of any of clauses 16-24, wherein the processor and the memory being configured for communicating over the carrier comprising the plurality of BWPs utilizing BWP hopping, comprises the processor and the memory being further configured for utilizing the transceiver for monitoring a paging indicator search space of the first BWP according to a predetermined paging indication periodicity.
26. The apparatus of any of clauses 16-25, wherein the processor and the memory are further configured for switching the transceiver from a previous BWP to the first BWP based on the predetermined paging indication periodicity.
27. The apparatus of any of clauses 16-26, wherein the processor and the memory are further configured for receiving, via the transceiver, an information element indicating the first BWP as an assigned anchor BWP for the apparatus.
28. The apparatus of any of clauses 16-26, wherein the first BWP is a selected anchor BWP from among a plurality of anchor BWPs of the plurality of BWPs, and wherein the selected anchor BWP is located at a resource location based on a result of a hashing function using an identifier of the apparatus as an input parameter.
29. The apparatus of any of clauses 16-26, wherein the first BWP is a selected anchor BWP from among a plurality of anchor BWPs of the plurality of BWPs, and wherein the selected anchor BWP is a closest anchor BWP to the previous BWP from among the plurality of anchor BWPs.
30. The apparatus of any of clauses 16-26, wherein the first BWP is a selected anchor BWP from among a plurality of anchor BWPs of the plurality of BWPs, wherein the carrier comprises a plurality of non-overlapping hop regions, each of the hop regions comprising a respective subset of BWPs of the plurality of BWPs, each of the respective subsets of BWPs comprising a respective anchor BWP, wherein the previous BWP is within a first hop region of the plurality of hop regions, and wherein the selected anchor BWP is the respective anchor BWP of the first hop region.

31. A non-transitory computer-readable storage medium storing computer-executable code, comprising instructions for causing a wireless communication apparatus to communicate over a carrier comprising a plurality of bandwidth parts (BWPs) utilizing BWP hopping by switching between BWPs of the plurality of BWPs according to a hopping pattern; to receive a paging indicator message in a first BWP of the plurality of BWPs; responsive to the paging indicator message, to switch from the first BWP to a paging BWP of the plurality of BWPs, the paging BWP configured to carry paging messages; and to receive a paging message in the paging BWP.

32. The non-transitory computer-readable storage medium of clause 31, wherein the computer-executable code further comprises instructions for causing the wireless communication apparatus to receive a media access control (MAC) control element (CE) that includes the paging indicator message.

33. The non-transitory computer-readable storage medium of clause 31, wherein the computer-executable code further comprises instructions for causing the wireless communication apparatus to receive a downlink control information (DCI) message that includes the paging indicator message.

34. The non-transitory computer-readable storage medium of either of clauses 31 or 33, wherein the DCI is common to a plurality of UEs that includes the UE.

35. The non-transitory computer-readable storage medium of any of clauses 31-34, wherein the first BWP is located at first resources, and the paging BWP is located at second resources having a predetermined relationship with the first resources.

36. The non-transitory computer-readable storage medium of any of clauses 31-35, wherein the predetermined relationship comprises a predetermined frequency offset between the first resources and the second resources.

37. The non-transitory computer-readable storage medium of any of clauses 31-35, wherein the paging BWP is a selected paging BWP from among a plurality of paging BWPs of the plurality of BWPs, and wherein the predetermined relationship comprises the selected paging BWP being a closest paging BWP to the first BWP from among the plurality of paging BWPs.

38. The non-transitory computer-readable storage medium of any of clauses 31-37, wherein paging indicator message comprises resource information for identifying a resource location of the paging BWP, the resource information comprising at least one of: an explicit indication of the resource location of the paging BWP, a radio network temporary identifier (RNTI) field comprising information indicating the resource location of the paging BWP, or an input parameter for a hashing function for calculation of the resource location of the paging BWP.

39. The non-transitory computer-readable storage medium of any of clauses 31-37, wherein the paging BWP is a selected paging BWP from among a plurality of paging BWPs of the plurality of BWPs, wherein the carrier comprises a plurality of non-overlapping hop regions, each of the hop regions comprising a respective subset of BWPs of the plurality of BWPs, each of the respective subsets of BWPs comprising a respective paging BWP, wherein the first BWP is within a first hop region of the plurality of hop regions, and wherein the selected paging BWP is the respective paging BWP of the first hop region.

40. The non-transitory computer-readable storage medium of any of clauses 31-9, wherein the instructions for causing the wireless communication apparatus to communicate over the carrier comprising the plurality of BWPs utilizing BWP hopping further comprise instructions for causing the wireless communication device to monitor a paging indicator search space of the first BWP according to a predetermined paging indication periodicity.

41. The non-transitory computer-readable storage medium of any of clauses 31-40, wherein the computer-executable code further comprises instructions for causing the wireless communication apparatus to switch from a previous BWP to the first BWP based on the predetermined paging indication periodicity.

42. The non-transitory computer-readable storage medium of any of clauses 31-41, wherein the computer-executable code further comprises instructions for causing the wireless communication apparatus to receive an information element indicating the first BWP as an assigned anchor BWP for the UE.

43. The non-transitory computer-readable storage medium of any of clauses 31-41, wherein the first BWP is a selected anchor BWP from among a plurality of anchor BWPs of the plurality of BWPs, and wherein the selected anchor BWP is located at a resource location based on a result of a hashing function using an identifier of the UE as an input parameter.

44. The non-transitory computer-readable storage medium of any of clauses 31-41, wherein the first BWP is a selected anchor BWP from among a plurality of anchor BWPs of the plurality of BWPs, and wherein the selected anchor BWP is a closest anchor BWP to the previous BWP from among the plurality of anchor BWPs.

45. The non-transitory computer-readable storage medium of any of clauses 31-41, wherein the first BWP is a selected anchor BWP from among a plurality of anchor BWPs of the plurality of BWPs, wherein the carrier comprises a plurality of non-overlapping hop regions, each of the hop regions comprising a respective subset of BWPs of the plurality of BWPs, each of the respective subsets of BWPs comprising a respective anchor BWP, wherein the previous BWP is within a first hop region of the plurality of hop regions, and wherein the selected anchor BWP is the respective anchor BWP of the first hop region.

46. An apparatus for wireless communication, comprising: means for communicating over a carrier comprising a plurality of bandwidth parts (BWPs) utilizing BWP hopping by switching between BWPs of the plurality of BWPs according to a hopping pattern; means for receiving a paging indicator message in a first BWP of the plurality of BWPs; means for, responsive to the paging indicator message, switching from the first BWP to a paging BWP of the plurality of BWPs, the paging BWP configured to carry paging messages; and means for receiving a paging message in the paging BWP.

47. The apparatus of clause 46, further comprising means for receiving a media access control (MAC) control element (CE) that includes the paging indicator message.
48. The apparatus of clause 46, further comprising means for receiving a downlink control information (DCI) message that includes the paging indicator message.
49. The apparatus of either of clauses 46 or 48, wherein the DCI is common to a plurality of scheduled entities that includes the apparatus.
50. The apparatus of any of clauses 46-49, wherein the first BWP is located at first resources, and the paging BWP is located at second resources having a predetermined relationship with the first resources.
51. The apparatus of any of clauses 46-50, wherein the predetermined relationship comprises a predetermined frequency offset between the first resources and the second resources.
52. The apparatus of any of clauses 46-50, wherein the paging BWP is a selected paging BWP from among a plurality of paging BWPs of the plurality of BWPs, and wherein the predetermined relationship comprises the selected paging BWP being a closest paging BWP to the first BWP from among the plurality of paging BWPs.
53. The apparatus of any of clauses 46-52, wherein paging indicator message comprises resource information for identifying a resource location of the paging BWP, the resource information comprising at least one of: an explicit indication of the resource location of the paging BWP, a radio network temporary identifier (RNTI) field comprising information indicating the resource location of the paging BWP, or an input parameter for a hashing function for calculation of the resource location of the paging BWP.
54. The apparatus of any of clauses 46-52, wherein the paging BWP is a selected paging BWP from among a plurality of paging BWPs of the plurality of BWPs; wherein the carrier comprises a plurality of non-overlapping hop regions, each of the hop regions comprising a respective subset of BWPs of the plurality of BWPs, each of the respective subsets of BWPs comprising a respective paging BWP; wherein the first BWP is within a first hop region of the plurality of hop regions; and wherein the selected paging BWP is the respective paging BWP of the first hop region.
55. The apparatus of any of clauses 46-54, wherein the means for communicating over the carrier comprising the plurality of BWPs utilizing BWP hopping, is further configured for monitoring a paging indicator search space of the first BWP according to a predetermined paging indication periodicity.
56. The apparatus of any of clauses 46-55, further comprising means for switching from a previous BWP to the first BWP based on the predetermined paging indication periodicity.
57. The apparatus of any of clauses 46-56, further comprising means for receiving an information element indicating the first BWP as an assigned anchor BWP for the apparatus.
58. The apparatus of any of clauses 46-56, wherein the first BWP is a selected anchor BWP from among a plurality of anchor BWPs of the plurality of BWPs, and wherein the selected anchor BWP is located at a resource location based on a result of a hashing function using an identifier of the apparatus as an input parameter.
59. The apparatus of any of clauses 46-56, wherein the first BWP is a selected anchor BWP from among a plurality of anchor BWPs of the plurality of BWPs, and wherein the selected anchor BWP is a closest anchor BWP to the previous BWP from among the plurality of anchor BWPs.
60. The apparatus of any of clauses 46-56, wherein the first BWP is a selected anchor BWP from among a plurality of anchor BWPs of the plurality of BWPs, wherein the carrier comprises a plurality of non-overlapping hop regions, each of the hop regions comprising a respective subset of BWPs of the plurality of BWPs, each of the respective subsets of BWPs comprising a respective anchor BWP, wherein the previous BWP is within a first hop region of the plurality of hop regions, and wherein the selected anchor BWP is the respective anchor BWP of the first hop region.

What is claimed is:

1. A method of wireless communication at a user-equipment (UE), comprising:
   communicating over a carrier comprising a plurality of bandwidth parts (BWPs) utilizing BWP hopping by switching between BWPs of the plurality of BWPs according to a planned hopping pattern;
   receiving a paging indicator message in a first BWP of the plurality of BWPs;
   responsive to the paging indicator message, switching from the first BWP to a paging BWP of the plurality of BWPs, the paging BWP configured to carry paging messages, wherein switching from the first BWP to the paging BWP is not part of the planned hopping pattern; and
   receiving a paging message in the paging BWP;
   wherein the paging BWP is a selected paging BWP from among a plurality of paging BWPs of the plurality of BWPs,
   wherein the carrier comprises a plurality of non-overlapping hop regions, each of the hop regions comprising a respective subset of BWPs of the plurality of BWPs, each of the respective subsets of BWPs comprising a respective paging BWP,
   wherein the first BWP is within a first hop region of the plurality of hop regions, and
   wherein the selected paging BWP is the respective paging BWP of the first hop region.

2. The method of claim 1, wherein:
   the paging indicator message is received via a media access control (MAC) control element (CE).

3. The method of claim 1, wherein:
   the paging indicator message is received via a downlink control information (DCI) message.

4. The method of claim 3, wherein the DCI is common to a plurality of UEs that includes the UE.

5. The method of claim 1, wherein:
   the first BWP is located at first resources, and
   the paging BWP is located at second resources having a predetermined relationship with the first resources.

6. The method of claim 5, wherein the predetermined relationship comprises a predetermined frequency offset between the first resources and the second resources.

7. The method of claim 5, wherein the paging BWP is a selected paging BWP from among a plurality of paging BWPs of the plurality of BWPs, and
   wherein the predetermined relationship comprises the selected paging BWP being a closest, in frequency, paging BWP to the first BWP from among the plurality of paging BWPs.

8. The method of claim 1, wherein paging indicator message comprises resource information for identifying a resource location of the paging BWP, the resource information comprising at least one of:
- an explicit indication of the resource location of the paging BWP;
- a radio network temporary identifier (RNTI) field comprising information indicating the resource location of the paging BWP; or
- an input parameter for a hashing function for calculation of the resource location of the paging BWP.

9. The method of claim 1, wherein the communicating over the carrier comprising the plurality of BWPs utilizing BWP hopping comprises:
- monitoring a paging indicator search space of the first BWP according to a predetermined paging indication periodicity.

10. The method of claim 9, further comprising:
- switching from a previous BWP to the first BWP based on the predetermined paging indication periodicity.

11. The method of claim 1, further comprising:
- receiving an information element indicating the first BWP as an assigned anchor BWP for the UE.

12. The method of claim 1, wherein the first BWP is a selected anchor BWP from among a plurality of anchor BWPs of the plurality of BWPs, and
- wherein the selected anchor BWP is located at a resource location based on a result of a hashing function using an identifier of the UE as an input parameter.

13. The method of claim 1, wherein the first BWP is a selected anchor BWP from among a plurality of anchor BWPs of the plurality of BWPs, and
- wherein the selected anchor BWP is a closest, in frequency, anchor BWP to a previous BWP from among the plurality of anchor BWPs.

14. The method of claim 1, wherein the first BWP is a selected anchor BWP from among a plurality of anchor BWPs of the plurality of BWPs,
- wherein the carrier comprises a plurality of non-overlapping hop regions, each of the hop regions comprising a respective subset of BWPs of the plurality of BWPs, each of the respective subsets of BWPs comprising a respective anchor BWP,
- wherein a previous BWP is within a first hop region of the plurality of hop regions, and
- wherein the selected anchor BWP is the respective anchor BWP of the first hop region.

15. A user equipment (UE), comprising:
- one or more processors;
- a memory comprising instructions; and
- a transceiver communicatively coupled to the processor,
- wherein the one or more processors are configured to execute the instructions and cause the UE to:
  - communicate over a carrier comprising a plurality of bandwidth parts (BWPs) utilizing BWP hopping by configuring the transceiver to switch between BWPs of the plurality of BWPs according to a planned hopping pattern;
  - receive, via the transceiver, a paging indicator message in a first BWP of the plurality of BWPs;
  - responsive to the paging indicator message, switch the transceiver from the first BWP to a paging BWP of the plurality of BWPs, the paging BWP configured to carry paging messages, wherein switching from the first BWP to the paging BWP is not part of the planned hopping pattern; and
  - receive, via the transceiver, a paging message in the paging BWP;
- wherein the paging BWP is a selected paging BWP from among a plurality of paging BWPs of the plurality of BWPs,
- wherein the carrier comprises a plurality of non-overlapping hop regions, each of the hop regions comprising a respective subset of BWPs of the plurality of BWPs, each of the respective subsets of BWPs comprising a respective paging BWP,
- wherein the first BWP is within a first hop region of the plurality of hop regions, and
- wherein the selected paging BWP is the respective paging BWP of the first hop region.

16. The UE of claim 15, wherein the one or more processors are further configured to cause the UE to:
- receive, via the transceiver, a media access control (MAC) control element (CE) that includes the paging indicator message.

17. The UE of claim 15, wherein the one or more processors are further configured to cause the UE to:
- receive, via the transceiver, a downlink control information (DCI) message that includes the paging indicator message.

18. The UE of claim 17, wherein the DCI is common to a plurality of scheduled entities that includes the UE.

19. The UE of claim 15, wherein:
- the first BWP is located at first resources, and
- the paging BWP is located at second resources having a predetermined relationship with the first resources.

20. The UE of claim 19, wherein the predetermined relationship comprises a predetermined frequency offset between the first resources and the second resources.

21. The UE of claim 19, wherein the paging BWP is a selected paging BWP from among a plurality of paging BWPs of the plurality of BWPs, and
- wherein the predetermined relationship comprises the selected paging BWP being a closest, in frequency, paging BWP to the first BWP from among the plurality of paging BWPs.

22. The UE of claim 15, wherein paging indicator message comprises resource information for identifying a resource location of the paging BWP, the resource information comprising at least one of:
- an explicit indication of the resource location of the paging BWP;
- a radio network temporary identifier (RNTI) field comprising information indicating the resource location of the paging BWP; or
- an input parameter for a hashing function for calculation of the resource location of the paging BWP.

23. The UE of claim 15, wherein the one or more processors are configured to cause the UE to communicate over the carrier comprising the plurality of BWPs utilizing BWP hopping, and is further configured to cause the UE to:
- utilize the transceiver for monitoring a paging indicator search space of the first BWP according to a predetermined paging indication periodicity.

24. The UE of claim 23, wherein the one or more processors are further configured to cause the UE to:
- switch the transceiver from a previous BWP to the first BWP based on the predetermined paging indication periodicity.

25. The UE of claim 15, wherein the one or more processors are further configured to cause the UE to:

receive, via the transceiver, an information element indicating the first BWP as an assigned anchor BWP for the UE.

26. The UE of claim 15, wherein the first BWP is a selected anchor BWP from among a plurality of anchor BWPs of the plurality of BWPs, and
wherein the selected anchor BWP is located at a resource location based on a result of a hashing function using an identifier of the UE as an input parameter.

27. The UE of claim 15, wherein the first BWP is a selected anchor BWP from among a plurality of anchor BWPs of the plurality of BWPs, and
wherein the selected anchor BWP is a closest, in frequency, anchor BWP to a previous BWP from among the plurality of anchor BWPs.

28. The UE of claim 15, wherein the first BWP is a selected anchor BWP from among a plurality of anchor BWPs of the plurality of BWPs,
wherein the carrier comprises a plurality of non-overlapping hop regions, each of the hop regions comprising a respective subset of BWPs of the plurality of BWPs, each of the respective subsets of BWPs comprising a respective anchor BWP,
wherein a previous BWP is within a first hop region of the plurality of hop regions, and
wherein the selected anchor BWP is the respective anchor BWP of the first hop region.

* * * * *